US011881075B2

(12) United States Patent
Fisher et al.

(10) Patent No.: US 11,881,075 B2
(45) Date of Patent: Jan. 23, 2024

(54) MAHJONG ROULETTE GAMING SYSTEM, AND METHOD

(71) Applicant: CG TECHNOLOGY, L.P., New York, NY (US)

(72) Inventors: Donald Fisher, Cary, IL (US); Melissa S. Langtim, Elgin, IL (US); Douglas Krich, Cary, IL (US); Darlene Marie Garmann, Watford City, ND (US); Stephen Foote, Queensland (AU)

(73) Assignee: CG TECHNOLOGY, L.P., New York, NY (US)

( * ) Notice: Subject to any disclaimer, the term of this patent is extended or adjusted under 35 U.S.C. 154(b) by 134 days.

(21) Appl. No.: 17/699,291

(22) Filed: Mar. 21, 2022

(65) Prior Publication Data

US 2022/0215714 A1 Jul. 7, 2022

Related U.S. Application Data

(63) Continuation of application No. 17/078,529, filed on Oct. 23, 2020, now Pat. No. 11,282,329, which is a (Continued)

(51) Int. Cl.

*G07F 17/32* (2006.01)
*A63F 5/00* (2006.01)

(Continued)

(52) U.S. Cl.

CPC ............ *G07F 17/32* (2013.01); *A63F 5/0088* (2013.01); *A63F 5/0005* (2013.01); *A63F 5/0094* (2013.01);

(Continued)

(58) Field of Classification Search

CPC .. G07F 17/32; G07F 17/3213; G07F 17/3216; G07F 17/322; G07F 17/3272; G07F 17/3293; A63F 5/0088; A63F 5/0005; A63F 5/0094; A63F 5/02; A63F 2009/2435; A63F 2009/2457; A63F 2009/205

See application file for complete search history.

(56) References Cited

U.S. PATENT DOCUMENTS

2006/0066044 A1* 3/2006 Dabosh ..................... A63F 5/00 273/143 R
2008/0108401 A1* 5/2008 Baerlocher ............. G07F 17/32 463/12

(Continued)

*Primary Examiner* — Jeffrey S Vanderveen

(57) ABSTRACT

A gaming system combines roulette and mahjong gaming into a single new game for ball-effecting a mahjong event. The game may comprise a grouped series of roulette wheel assemblies bearing mahjong symbols and a plurality of balls respectively receivable in ball-receiving sectors for identifying a number of mahjong symbols. The group of mahjong symbols identified by the randomly received balls defines a wagerable mahjong event. Players may participate in the gaming in a player participation area, which area is opposed a theatrical or auditorium type visual display of the grouped roulette wheel assembly action. Players may input their wagers in the player participation area and watch the roulette action unfold on the visual displays. Certain methodology for effecting the mahjong event is further supported by the roulette medium.

12 Claims, 21 Drawing Sheets

Related U.S. Application Data continuation of application No. 16/262,852, filed on Jan. 30, 2019, now Pat. No. 10,818,125, which is a continuation of application No. 14/727,164, filed on Jun. 1, 2015, now abandoned, which is a continuation-in-part of application No. 12/746,408, filed as application No. PCT/AU2007/001880 on Dec. 5, 2007, now Pat. No. 9,044,667, and a continuation-in-part of application No. 11/732,995, filed on Apr. 5, 2007, now abandoned, which is a continuation-in-part of application No. 11/711,546, filed on Feb. 27, 2007, now Pat. No. 7,926,810, said application No. 12/746,408 is a continuation-in-part of application No. 11/711,546, filed on Feb. 27, 2007, now Pat. No. 7,926,810, said application No. 11/732,995 is a continuation-in-part of application No. 11/711,374, filed on Feb. 27, 2007, now Pat. No. 8,267,403, said application No. 12/746,408 is a continuation-in-part of application No. 11/711,374, filed on Feb. 27, 2007, now Pat. No. 8,267,403, which is a continuation-in-part of application No. 11/634,780, filed on Dec. 5, 2006, now abandoned, said application No. 11/711,546 is a continuation-in-part of application No. 11/634,780, filed on Dec. 5, 2006, now abandoned, said application No. 11/732,995 is a continuation-in-part of application No. 11/634,780, filed on Dec. 5, 2006, now abandoned.

(51) Int. Cl.
*A63F 5/02* (2006.01)
*A63F 9/24* (2006.01)

(52) U.S. Cl.
CPC ......... *A63F 5/02* (2013.01); *A63F 2009/2435* (2013.01); *A63F 2009/2457* (2013.01); *G07F 17/322* (2013.01); *G07F 17/3213* (2013.01); *G07F 17/3216* (2013.01); *G07F 17/3272* (2013.01)

(56) References Cited

U.S. PATENT DOCUMENTS

2008/0274792 A1* 11/2008 Walker .................... G07F 17/32 463/43
2010/0120487 A1* 5/2010 Walker .................. G07F 17/322 463/25
2016/0351008 A1* 12/2016 Walker .................... A63F 1/067

* cited by examiner

40

41

| | | | | | |
|---|---|---|---|---|---|
| bam3 | cir3 | wan1 | sea1 | bam4 | cir4 |
| wan9 | bloem1 | bam8 | cir7 | wan7 | wdragon |
| bam2 | cir2 | wan4 | rdragon | bam9 | cir9 |
| wan5 | gdragon | bam5 | cir1 | wan3 | north |
| bam1 | cir5 | wan6 | west | bam6 | cir6 |
| wan2 | east | bam7 | cir8 | wan8 | south |
| bam3 | cir8 | wan5 | south | bam6 | cir5 |
| wan1 | bloem2 | bam4 | cir9 | wan9 | east |
| bam2 | cir6 | wan2 | wdragon | bam8 | cir3 |
| wan4 | sea2 | bam5 | cir7 | wan7 | gdragon |
| bam1 | cir1 | wan8 | west | bam7 | cir2 |
| wan6 | north | bam9 | cir4 | wan3 | rdragon |
| bam7 | cir4 | wan3 | gdragon | bam8 | cir2 |
| wan1 | bloem3 | bam5 | cir5 | wan7 | sea3 |
| bam3 | cir3 | wan4 | east | bam2 | cir1 |
| wan5 | rdragon | bam4 | cir8 | wan2 | west |
| bam9 | cir9 | wan8 | south | bam6 | cir7 |
| wan9 | north | bam1 | cir6 | wan6 | wdragon |
| bam4 | cir4 | wan3 | wdragon | bam9 | cir8 |
| wan7 | gdragon | bam2 | cir9 | wan4 | south |
| bam3 | cir6 | wan5 | west | bam8 | cir1 |
| wan9 | north | bam6 | cir2 | wan2 | rdragon |
| bam1 | cir5 | wan8 | east | bam7 | cir7 |
| wan6 | bloem4 | bam5 | cir3 | wan1 | sea4 |

*FIG. 9(a)*

Payout Table

| Bet Name | Numbers | Payout | Expectation |
|---|---|---|---|
| Straight | 1 | 39 | 0.9524 |
| Split | 2 | 19 | 0.9524 |
| Street | 4 | 9 | 0.9524 |
| Double Street | 8 | 4 | 0.9524 |
| Corner | 4 | 9 | 0.9524 |
| Column | 10 | 3 | 0.9524 |
| Two Columns | 20 | Even | 0.9524 |
| Any Flower | 4 | 9 | 0.9524 |
| Any Season | 4 | 9 | 0.9524 |
| Any Wind | 4 | 9 | 0.9524 |
| Any Dragon | 3 | 12 | 0.9286 |

Payout Table

| Bet Name | Numbers | Payout | Expectation |
|---|---|---|---|
| Flower/Season | 1 | 31 | 0.8889 |
| Straight | 1 | 6/31/499/49999 | 0.8994 |
| Split | 2 | 3/6/39/999 | 0.8999 |
| Street | 3 | 1/6/54/499 | 0.8994 |
| Double Street | 6 | 0/4/15/95 | 0.9524 |
| Corner | 11 | 0/1/2/13 | 0.9001 |
| Two Columns | 22 | 0/0/0/11 to 2 | 0.9065 |
| Any Flower | 4 | 1/3/6/45 | 0.8996 |
| Any Season | 4 | 1/3/6/45 | 0.8996 |
| Any Wind | 4 | 1/3/6/45 | 0.8996 |
| Any Chow | Many | 89 | 0.8985 |

Mahjong Jackpot

| Jackpot Win | Start-Up | Percentage |
|---|---|---|
| Any Kong | 500 | 0.55% |
| Dragon/Wind Pung | 25 | 0.55% |
| Suit Pung | 5 | 1.1% |

FIG. 17

| Result number | Ball 1 | Ball 2 | Ball 3 | Ball 4 |
|---|---|---|---|---|
| 1 | Green dragon | Red Dragon | Green dragon | 1 Circle |
| 2 | Season 1 | Flower 2 | Flower 3 | Flower 4 |
| 3 | 1 bamboo | 2 Bamboo | 3 Bamboo | 4 Circle |
| 4 | South Wind | North Wind | North Wind | Green dragon |
| 5 | 4 Circle | 4 Circle | White dragon | 4 Circle |
| 6 | Red Dragon | East Wind | Red Dragon | Red Dragon |
| 7 | 1 Circle | North Wind | 1 Circle | 1 Circle |

FIG. 18

| bet/result | 1 | 2 | 3 | 4 | 5 | 6 | 7 |
|---|---|---|---|---|---|---|---|
| Green Dragon Straight | 31 (2 hit) | 0 | 0 | 6 (1 hit) | 0 | 0 | 0 |
| Any Wind | 0 | 0 | 0 | 6 (3 hit) | 0 | 1 (1 hit) | 0 |
| 1/2 Circles Split | 3 (1 hit) | 0 | 0 | 0 | 0 | 0 | 999 (4 hit) |
| Any Chow | 0 | 0 | 89 | 0 | 0 | 0 | 0 |
| Any Flower | 0 | 6 (3 hit) | 0 | 0 | 0 | 0 | 0 |
| Dragon Street | 53 (3 hit) | 0 | 0 | 1 (1 hit) | 1 (1 hit) | 54 (3 hit) | 0 |
| Second Column | 1 (2 hit) | 0 | 0 (1 hit) | 0 | 2 (3 hit) | 2 (3 hit) | 13 (4 hit) |

*FIG. 19*

MAHJONG ROULETTE GAMING SYSTEM, AND METHOD

CROSS-REFERENCE TO RELATED APPLICATIONS

This application is a continuation of U.S. patent application Ser. No. 17/078,529 filed Oct. 23, 2020, which is a continuation of Ser. No. 16/262,852 filed Jan. 30, 2019 (now U.S. Pat. No. 10,818,125 issued on Oct. 27, 2020), which is a continuation of U.S. patent application Ser. No. 14/727,164 filed on Jun. 1, 2015, which is continuation-in-part of, and claims priority from, U.S. patent application Ser. No. 12/746,408 filed Nov. 15, 2011 (now U.S. Pat. No. 9,044,667 issued on Jun. 2, 2015). U.S. patent application Ser. No. 12/746,408 is a national stage application of, and claims priority from, PCT Application No. PCT/AU2007/001880, filed on Dec. 5, 2007 (International Publication No. WO 2008/067604). U.S. patent application Ser. No. 12/746,408 is also a continuation-in-part of, and claims priority from, U.S. patent application Ser. No. 11/711,374 filed on Feb. 27, 2007 (U.S. Pat. No. 8,267,403), which is a continuation of, and claims priority from, U.S. patent application Ser. No. 11/634,780, filed on Dec. 5, 2006 (U.S. Patent Application Publication No. 2008/0128986). U.S. patent application Ser. No. 12/746,408 is also a continuation-in-part of, and claims priority from, U.S. patent application Ser. No. 11/711,546, filed on Feb. 27, 2007 (U.S. Pat. No. 7,926,810), which is a continuation-in-part of, and claims priority from, U.S. patent application Ser. No. 11/634,780, filed on Dec. 5, 2006. U.S. patent application Ser. No. 12/746,408, is also a continuation-in-part of, and claims priority from, U.S. patent application Ser. No. 11/732,995, filed on Apr. 5, 2007 (U.S. Patent Application Publication No. 2008/0132316), which is a continuation-in-part of, and claims priority from, (1) U.S. patent application Ser. No. 11/634,780, filed on Dec. 5, 2006, (2) U.S. patent application Ser. No. 11/711,374, filed on Feb. 27, 2007, and (3) U.S. patent application Ser. No. 11/711,546, filed on Feb. 27, 2007. The contents of U.S. patent application Ser. No. 12/746,408, the contents of International Application No. PCT/AU2007/001880, the contents of U.S. patent application Ser. No. 11/634,780, the contents of U.S. patent application Ser. No. 11/711,546, the contents of U.S. patent application Ser. No. 11/711,374, and the contents of U.S. patent application Ser. No. 11/732,995 are each hereby incorporated by reference herein in its entirety.

BACKGROUND OF THE INVENTION

Field of the Invention

The present invention relates generally to games of chance, and more particularly to novel variations on the roulette wheel and wagers placed thereon. The present invention essentially comprises a roulette wheel comprising mahjong or similar other symbols for effecting a mahjong or symbolic roulette gaming experience.

Description of the Prior Art

Gaming is ancient. Over time, core gaming themes and gaming rules have developed, which continue to enjoy wide popularity. In order to infuse some element of novelty into ancient games, gaming enthusiasts continually strive to enhance the gaming experience through inventive approaches to play. Roulette, for example, has been credited to many ancient sources, including Chinese origins and Roman origins. A more popularly held belief is that Blaise Pascal, the French mathematician (1623-1662) and physicist helped develop the essential Roulette device(s), due, in part, to his fascination with perpetual motion machines.

Whatever its origin, roulette has evolved into a casino and gambling game in which a croupier turns a round roulette wheel having 37 or 38 separately numbered pockets in which a ball must land. Conventional roulette wheels comprise pockets or wheel sectors numbered non-sequentially from 1 to 36 alternating between red and black backdrops. Most modem Roulette wheels further comprise at least one green pocket numbered “0”. Further, in the United States (as opposed to Europe), most roulette wheels comprise a second green pocket marked “00” ostensibly for increasing the house advantage in the United States as compared to house advantage in European play.

A mah jongg or mahjong game set comprises tiles—of which there are 34 different types. These are the four Winds, East, South, West and North, the three Dragons, Green, Red and White, the Bamboo tiles, numbered one to nine, the Circles tiles, numbered one to nine, and the Wan tiles, again numbered one to nine. For each of the 34 different tile types there are four identical pieces provided in a Mah Jongg or mahjong set. The total number of playing tiles in the game is therefore 136 tiles. However in a set there are also eight special tiles that are used solely for the purpose of scoring bonus points, the Flower and Season tiles, we therefore have a total of 144 tiles in a mahjong set as generally illustrated in FIG. 1. The ordering depicted in FIG. 1 is called the Symbolic Square of Mahjong and shows all 144 tiles in the game. Mahjong sets are mainly colored using only three colors, namely, red, blue, and green. These together represent the Three Extremities, namely, Mankind, Heaven and Earth, or more particularly, as follows:

Red signifies blood and therefore Mankind and more generally Life.

Blue signifies the sky, the Heavens and therefore dignity and purity.

Green symbolizes the Earth and nature, fertility, and natural richness

In traditional United States-based roulette play, if a player bets on a single number and wins, the payout is 35:1. Any number of other betting options, however, has become available to the gamer, which options offer lower payoffs, including bets on multiple numbers in various combinations or ranges, on all odd or all even numbers, or by color. Over time, variants on the basic roulette theme have evolved including electronic betting through computer stations, fully electronic ball spin/wheel simulations, stand-alone games on a slot machine or through Internet gaming, multiple balls, and characters other than numerals, such as zodiac symbols and the like. Bearing in mind that the present application sets forth roulette gaming systems and methodology incorporating both traditional roulette concepts (ball-identifying winning symbols) with traditional mahjong symbols, it is noted that state of the art relating to roulette gaming devices and the like is well developed, and a search into the state of roulette art reveals that a number of inventive roulette-based gaming devices are known in the prior art. Some of the more pertinent prior art relating to roulette type gaming devices of which the present inventors are aware, is briefly described and set forth below.

U.S. Pat. No. 3,853,324 (’324 Patent), which issued to Reiner et al., discloses a Combined Game of Chance and Skill. The ’324 Patent teaches a combined game of chance and skill which is a modified form of the popular game known as bingo. The game includes a circular playing field, a longitudinal alley extending therefrom, and a ball-propelling mechanism mounted at one end of the alley for propelling small and large indicating balls along the alley and onto the playing field. The playing field includes an outer member and an inner disc which are rotatably driven in opposite directions. The outer member is provided with a plurality of indicia-carrying partitions which are spaced to trap the large indicating ball which is propelled onto the playing field but are spaced to allow the small indicating ball to pass through the partitions and onto the inner disc. The inner disc is provided with a plurality of indicia-carrying, ball-receiving pockets adapted to receive the small indicating ball which passes through the partitions.

U.S. Pat. No. 4,222,561 ('561 Patent), which issued to Whitten, discloses a Game Device. The '561 Patent teaches a roulette type device whereby a predetermined set of word category cards are selected randomly one at a time together with spinning a roulette wheel to select the first letter designation for a word response by the players which satisfies both the category and first letter so selected. It will be seen from an inspection of the '561 Patent that the roulette type wheel comprises a series of letters of the Roman alphabet thereon. The Whitten wheel includes a total of thirty-six lettered positions thereon, with certain of the letters being duplicitous. Whitten utilizes the device to enable random selection of a letter by his wheel to designate the first letter of an object from a group of related objects, e.g., kinds of fruit, etc. The subject user or gamer must come up with an object having a name that begins with the letter selected on the Whitten roulette wheel in order to win that particular play or turn.

U.S. Pat. No. 4,887,819 ('819 Patent), which issued to Walker, discloses a Casino Board Game. The '819 Patent teaches a relatively complex game, incorporating use of a roulette wheel and combines aspects of several different traditional or conventional gambling games. In this regard, the player uses either a card game similar to blackjack or a slot machine to determine the number of spaces to be moved along a segmented path, the particular game being selected by the instructions contained in the segment on which the player landed on the prior move. Each segment also contains further instructions, some of those instructions designating a further gambling apparatus and giving odds. These further apparatuses are a roulette game or a dice game, and the player landing on that segment may gamble at these games at the designated odds. Other players can join in the gambling when the roulette game and the dice game are played. The objective of the game is for a player to avoid penalties designated on the game board, acquire a majority of the playing chips until either all of the other players become "busted" or the casino bank becomes "busted". Notably, no alphabetic layout for the roulette wheel is disclosed.

U.S. Pat. No. 5,259,616 ('616 Patent), which issued to Bergmann, discloses a Roulette-Type Coin-Operated Gaming Machine. The '616 Patent teaches a process for operating a slot machine that works as a roulette wheel. According to the process, the gambler determines the amount of the stake by introducing coins then by pressing selection keys. A microprocessor determines the result of the game by means of random algorithm. When the chosen number is hit, the microprocessor instructs the coin distributing unit to eject the main prize. When a chosen number is hit, the microprocessor drives another processor with a random generator. The random generator determines, depending on a written algorithm, a gain multiplier which is multiplied by the amount of the stake on the number that was hit. The payment unit is then instructed to distribute an amount in coins which corresponds to the product of the stake on the number that was hit and the gain multiplier.

U.S. Pat. No. 5,553,853 ('853 Patent), which issued to Sackitey, discloses a Game Apparatus and Method of Play for Teaching DNA Related Technologies. The '853 Patent teaches a game including a selector for selecting a nucleotide from a group of nucleotides normally associated with DNA. By randomly selecting nucleotides and recording the selected nucleotides, each player creates a unique DNA sequence. The DNA sequence is used in one of a variety of game motifs to determine the winner of the game. It will be seen from an inspection of the '853 Patent that a roulette-type wheel having a series of seventy-one lettered positions thereon enables play. Certain alphabetic characters are repeated, with several (Roman) alphabetic characters being omitted from the wheel.

U.S. Pat. No. 5,755,440 ('440 Patent), which issued to Sher, discloses an Enhanced Roulette-Style Game. The '440 Patent teaches a new Roulette apparatus comprising multiple balls and separate tracks for launching each of the balls. In a preferred embodiment there are two balls and two tracks, and a special apparatus for launching the balls. In one embodiment the launching apparatus is air powered, and in another the apparatus is mechanical with the balls accelerated by contact with a spinning wheel. In either case the launching apparatus may be hand-held or mounted to a frame and positioned to propel the balls into the tracks. In another aspect of the invention the wheel of the Roulette apparatus is provided as a dynamic display, which may be of several different types, such as LCD and dynamic holographic displays, and electronic player stations are provided wherein players may customize and place bets. In many embodiments the games are enhanced by audio effects including such sounds as balls being launched, balls rolling in Roulette apparatus, thunder strikes, and music.

U.S. Pat. No. 6,164,647 ('647 Patent), which issued to Chee, discloses a Casino Wheel Game System. The '647 Patent teaches a roulette assembly comprising a lower wheel divided into a plurality of sections each representative of at least one of a unique number and a unique color. Also included is an upper wheel rotatably mounted on the lower wheel and divided into a plurality of sections each representative of at least one of a unique number and a unique color. Upon the upper wheel and the lower wheel being spun, the upper wheel slows to engage with the lower wheel and a unique number and color combination is indicated. It will be seen from an inspection of the '647 Patent that a mechanically complex roulette wheel is disclosed. Upper and lower wheels may be randomly joined to select a specific color and number outcome on the lower wheel. Notably, no alphabetic designations on the wheel are disclosed.

U.S. Pat. No. 6,227,542 ('542 Patent) and U.S. Pat. No. 6,663,106 ('106 Patent), both of which issued to Cosmi, disclose certain Roulette of Improved Type and New Gambling Game Providing for the Use of Said Improved Roulette. The '542 and '106 Patents teach roulette of a new type including two bowls coaxial to each other and rotating around the same axis and two small balls, each ball rolling around one of the bowls, where on each bowl are engraved data which refer to an independent event. On a first embodiment, the two independent events are: the signs of the zodiac, the numbers from 0 to 31, where the signs of the zodiac are preferably engraved on the external, ring-shaped bowl, while the numbers from 0 to 31 are preferably engraved on the internal bowl. On a second embodiment, the events engraved on the two bowls are related to one or more of the calendars used in Asiatic countries (China, Korea, Japan and so on). Furthermore, a new gambling game providing for the use of said improved roulette is described.

U.S. Pat. No. 6,406,022 ('022 Patent), which issued to Nadibaidze, discloses a Method of Playing a Roulette-Type Mass Amusement Game Having a Betting Field with Zodiac Signs. The '022 Patent teaches a method of mass amusement using a stake field simulating a roulette-type betting field with various-color stake squares with various-color information marks from 1 to 36 formed thereupon and the twelve Zodiac signs in the stake squares with digital information marks 1, 2, 3, 5, 7, 11, 13, 17, 19, 23, 29, and 31. Also formed is a flat image of a stationary roulette wheel having 36 main sectors and one or two additional sectors, with each main sector to contain, first, the images of digits from 1 to 36 with the images of the twelve Zodiac signs in the places of location of the prime numbers 1, 2, 3, 5, 7, 11, 13, 17, 19, 23, 29, and 31, and, secondly, two images of the hexagonal die with information marks being various number of spots: from one to six. Then, the players place their bets on the stake squares of the stake field, the procedure to be followed by choosing two pairs of random gambling indices by means of double simultaneous casting of two hexagonal dice.

United States Patent Application Publication No. 2005/0285336, which was authored by Ilievski, discloses an alphabetic roulette game comprising a roulette wheel having twenty-five positions thereon, comprising the twenty-six letters of the Roman alphabet and a double letter position. A wagering surface or table provides for the placement of wagers upon the chance of any of the single letters (or the double letters) or a letter of any of several groups of letters turning up on a spin of the wheel. The game also provides for wagers on the chance of a given letter turning up on two or more consecutive turns of the wheel. A further wagering opportunity is provided for wagering upon the chance of a letter within a given word or words coming up on a turn of the wheel. The alphabetic positions on the wheel, and corresponding positions on the table, may be colored to allow players to place wagers on a color or colors, as desired.

It will be seen from a further review of the above-referenced patents and other prior art generally known to exist, however, that the prior art does not teach a roulette type game for telling a mahjong story as summarized in a mahjong event. In this case, the mahjong event may be said to comprise the identification of multiple mahjong symbols by way of a roulette medium. The prior art thus perceives a need for a roulette medium for effecting a mahjong event or for otherwise dealing a hand.

SUMMARY OF THE INVENTION

Accordingly, it is an object of the present invention to provide a combination roulette-mahjong gaming medium. In a first preferred practice of the present invention, a roulette-gaming system is provided for effecting or eliciting a multi-wheel roulette gaming experience. In this regard, it is contemplated that the roulette-gaming system of the present invention may be said to comprise a grouped series of roulette wheel assemblies; a player participation area; certain central-processing means; and certain visual display means. Each roulette wheel assembly may further comprise a roulette wheel; a roulette ball; a dome for preventing balls from escaping from the roulette wheel(s); certain automated rotation means for rotating the roulette wheel about a wheel axis of rotation; certain automated launch means for launching the roulette ball; and certain means for automatically detecting in which slot(s) the ball(s) have landed.

Each roulette wheel comprises a plurality of ball-receiving sectors and at least one ball-launching track. Each ball-receiving sector comprises a superior sector surface, which superior sector surfaces each bear or are otherwise cooperable with a select wheel symbol as may be preferably defined by a mahjong symbol or as may be alternatively defined by similar other symbolism, such as traditional playing card symbols. The roulette balls are respectively launchable from the ball-launching tracks and respectively receivable in one of the ball-receiving sectors for providing a multi-sector event. The multi-sector event may be defined by the group of symbols identified by the balls as they come to rest in the ball-receiving sectors.

In other words, the multi-sector event, if bearing a mahjong motif, is essentially a mahjong event. Mahjong symbols each represent meaning beyond one dimension. And thus, combinations of symbols may be combined to essentially tell a story or mahjong event. For example, the Bamboo I symbol represents the Chinese character: "K'ung". The first tile of the first suit of the three suits (the others being Circles and Wan)—it primarily signifies success. However success can lead to pride, which in turn can lead to vanity. The Bamboo 1 symbol is a peacock—an emblem of beauty that represents a lady, in the prime of her life, gazing in a mirror. The mirror is the symbol of the cosmos, depending on the interpretation, and the lady can be admiring her own reflection or contemplating her own mortality. The mirror frequently indicates a change of direction in life. The Circle 1 symbol is the Chinese character: "Chu". It is the first of the Circles suit and represented by the pearl—its Chinese name is "the Moon from the Bottom of the Sea". Pearls indicate the refinement of a connoisseur and so this tile suggests luxury and wealth.

The Wan1 symbol is Chinese character: "Ju". This symbol is represented by the Chinese character for one and resembling the bar of a door. Therefore the significance is of a barrier being lifted, or a door being opened, bringing new opportunities ahead. Finally, the Red Dragon symbol is represented by the Chinese character: "Chung", which means centre or middle. The "Chung" character represents an interpretive arrow striking the centre of a target. The meaning of this tile is therefore—success or achievement. Notably, this tile is the counterpart of the Green Dragon tile which shows the arrow about to leave the bow. It is commonly called the Red Dragon in western mahjong sets because the "Chung" character is generally drawn in red ink.

In the foregoing recitation, the multi-sector event may thus be defined as a Bamboo1, Circle1, Wan1, Red Dragon event. If a player had been wagering on this combination of symbols, he or she may have done so because of some underlying meaning to that player. It being noted that each mahjong symbol has underlying meaning, the combination of symbols may effectively provide a story of sorts. For example, in the foregoing example, the player who may have wagered this event may have been seeking a change of direction in the player's life (Bamboo 1) for the purpose of enhancing the player's wealth (Circle1). The new opportunities presented (Wan1) via the change in life's direction, lay the potential for greater success or achievement (Red Dragon). Thus, the mahjong event or multi sector event represented by the four symbols: Bamboo1, Circle1, Wan1, and Red Dragon are more than just four symbols to the player. The roulette medium enables random selection of symbols, which selection process may be viewed by players as fate-based and meaningful beyond the face of the tile.

In addition to mahjong symbolism, the invention uses mahjong scoring combinations to define winning events such as progressive jackpot triggers. For example, a progressive jackpot may be triggered by a Kong, which may be defined as four hits or ball-identifications of the same symbol; or a Pung, which may be defined as three hits or ball-identifications of the same symbol. Further, players may choose to wager on a Chow as may be defined by three consecutive tiles or symbols in the same suit.

Players may congregate in the player participation area spatially separated from the roulette wheel assemblies and together experience the mahjong events as they unfold. The player participation area may thus preferably comprise certain wager-inputting means for enabling electronic entry of wagers, which wagers identify select wager symbols. Together, the wheel symbols and wager symbols have paired symbol correspondence for yielding a winning event. The central processing means essentially function to (1) collect the wagers, (2) govern the automated rotation and launch means, (3) compare the wagers to the multi-sector event, (4) calculate payouts to players should a wager match the multi-sector event, and (5) govern credits-debits during roulette gaming.

The visual display means essentially function to visually display activity at the grouped series of roulette wheel assemblies or grouped roulette wheel assembly action (comprising the multi-sector event) to the player participation area. Notably, the player participation area is spatially separated from the site of wheel action and thus the visual display means may well function to add excitement to the roulette gaming experience by enabling theatrical or cinematic type viewing of the gaming events. The grouped roulette wheel assembly action may be said to further comprise wheel rotations, roulette ball action, and, as noted, the multi-sector event. The visual display(s) may well take the form of either a large, centralized screen in an auditorium type area or via individualized screens at player seats or stations.

It is contemplated that in the preferred embodiment, the wheel symbols and the wagerable symbols are defined by mahjong symbols and that the automated launch means comprise certain ball-conducting conduit for converting a potentially energetic roulette ball to a kinetically energetic roulette ball and for outletting the kinetically energetic roulette ball upon the roulette wheel. In this last regard, the reader is further directed to U.S. patent application Ser. No. 11/711,546 ('546 application), filed in the United States Patent and Trademark Office on Feb. 27, 2007. This application claims the benefit of the '546 application and the specification of the '546 application is hereby incorporated by reference thereto. It may be readily seen from an inspection of the '546 application that the same more fully specifies a variety of inventive ball-delivery systems and apparatus, including multi-ball delivery devices and the like usable in combination with the essential mahjong or symbolic roulette set forth in this specification.

In a second preferred practice, it is contemplated that the present invention teaches a mahjong roulette game for ball-effecting a mahjong event, and which mahjong roulette game comprises a plurality of grouped roulette wheel assemblies and a player participation area. Each roulette wheel assembly comprises a roulette wheel; a roulette ball; means for rotating the wheel; means for launching the roulette ball; and certain means for automatically detecting in which slot(s) the ball(s) have landed.

Each roulette wheel comprises a plurality of ball-receiving sectors and at least one ball-launching track. Each ball-receiving sector comprises a superior sector surface bearing a select mahjong wheel symbol. The roulette balls are respectively launchable from the ball-launching tracks and respectively receivable in one of the ball-receiving sectors for providing a multi-symbolic event. The player participation area enables wagering input and comprises select mahjong wager symbols, the wheel and wager symbols having paired symbol correspondence, the paired symbol correspondence, and the multi-symbolic event for effecting a mahjong event.

Other objects of the present invention, as well as particular features, elements, and advantages thereof, will be elucidated or become apparent from, the following description and the accompanying drawing figures.

BRIEF DESCRIPTION OF THE DRAWINGS

Other features of our invention will become more evident from a consideration of the following brief description of our patent drawings:

FIG. 9(*a*) is a file layout depicting the preferred circumferential arrangement of the 144 tiles or symbols around the periphery of the roulette wheel otherwise depicted in FIG. 9.

FIG. 17 is a first payout table for four-ball mahjong roulette or roulette comprising 144 ball-receiving sectors with a breakdown of various possible wager selections.

FIG. 18 is a sample hits table showing possible mahjong events resulting from four-ball roulette gaming and 144 possible mahjong symbols.

FIG. 19 is a bets/payouts table corresponding to the sample hits table otherwise shown in FIG. 18.

DETAILED DESCRIPTION OF THE PREFERRED EMBODIMENT(S)

Figure 1:
FIG. 1 is a top perspective depiction of a first roulette wheel assembly of the present invention as combined with a fanciful creature and with an enlarged sectional view of the superior wheel surface showing ball-receiving sectors and mahjong symbols associated therewith.

Dragon Mahjong Roulette is a fusion of two traditional games from two distinct cultures. In other words, the heart of this invention is a fusion between two traditional games, namely roulette and mahjong. Mahjong is a traditional, social/gambling game played my many Chinese as well as other cultures. The symbols used are from mahjong—those that have been around for thousands of years. The game involves one or more roulette wheels of various configurations. However, in order to appeal primarily to the orient and the explosion of casino gambling in the East, instead of using numbers or letters, we instead will use the Mahjong symbols or tiles. Additionally, in some of the more complex variations of the game we integrate other facilities terminology from Mahjong, especially to provide new forms of progressive jackpots.

It is contemplated that basic dragon roulette or mahjong roulette comprises one roulette ball 10, which ball(s) 10 are illustrated and referenced in FIGS. 1, 7, 9, and 10-13; and a roulette wheel assembly 11. A number of individual roulette wheel assemblies 11 or roulette wheels are generally illustrated and referenced in FIGS. 1-5, 7, and 10-14. The roulette wheel assembly 11 for use during the basic mahjong roulette game of the present invention preferably comprises forty-two (42) mahjong symbols 16 as generally illustrated and depicted in FIG. 7.

Figure 4:
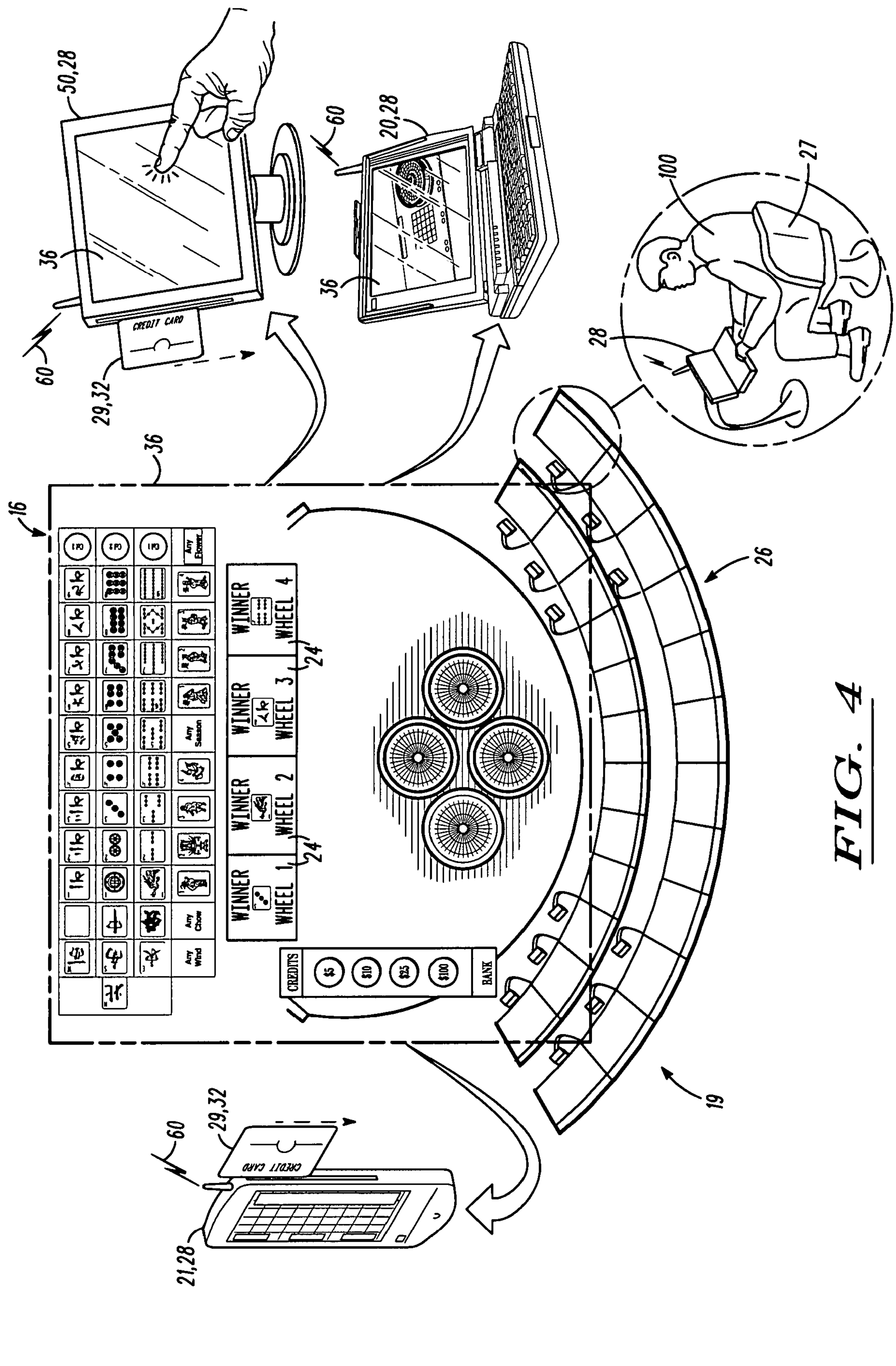
FIG. 4 is a reduced top plan type depiction of the roulette gaming system otherwise depicted in FIG. 3 as shown upon a personal viewing screen, which personal viewing screen may be integrated with a hand-held unit (shown at the left of the figure), a touch screen liquid crystal display tablet (shown at the upper right of the figure), and a notebook computer (shown at the lower right of the figure). An enlarged sectional type depiction of the player participation area is further shown with a player seated at a gaming interface device.
Figure 5:
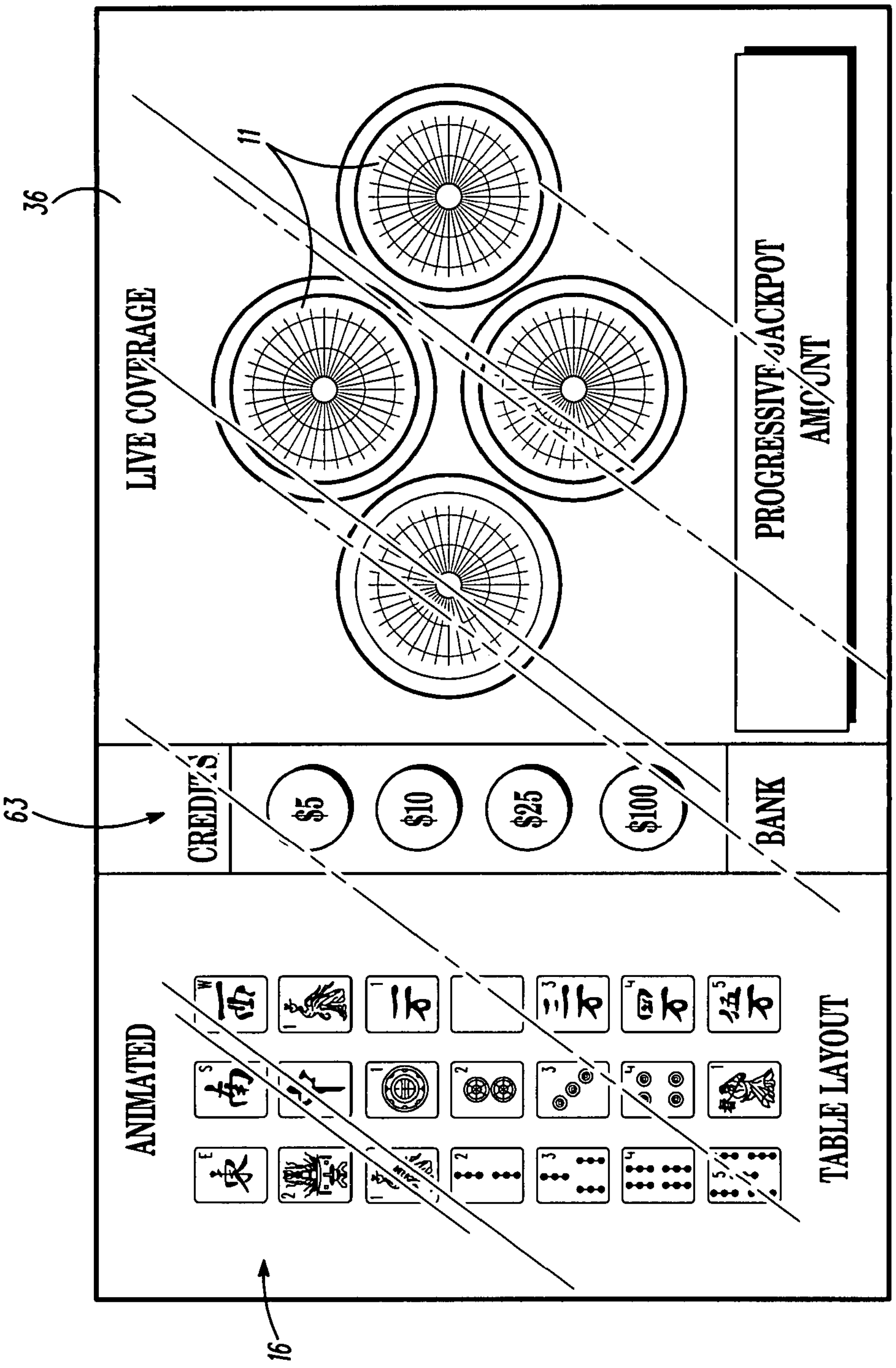
FIG. 5 is a depiction of an exemplary visual output for players showing an animated table layout, a credits-bank section, and live coverage portion of the grouped roulette wheel assembly action.
Figure 6:
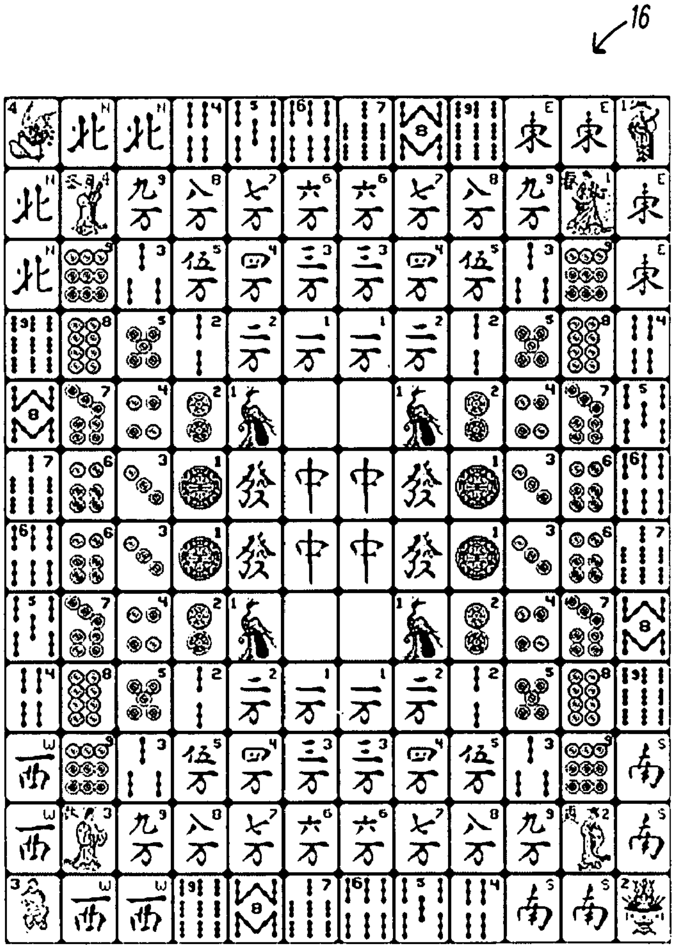
FIG. 6 is a Symbolic Square of Mahjong showing all 144 tiles that comprise a traditional mahjong tile or card deck.

Mahjong symbols 16 are further generally depicted and referenced in FIGS. 1, 2, 4-9, and 10-13. FIG. 6 depicts a full set of mahjong symbols 16. By way of comparison, a traditional playing card deck comprising four suits (Spades, Clubs, Diamonds, and Hearts) with thirteen cards (numbered one (or an ace) through 10, a Jack or (J), a Queen (Q), and a King (K)) in each suit is exemplified in FIG. 14. It is contemplated that a mahjong playing deck (entirely depicted in FIG. 6) is akin to a traditional playing card deck (partially depicted in FIG. 14) insofar as each may be utilized to form a symbolic hand, the symbolic hand being formed comprising a plurality of cards or tiles dealt or otherwise selected from the respective deck.

Each of the mahjong symbols 16 may preferably be assigned to a slot or ball-receiving sector 12 of the roulette wheel 11 as generally depicted in certain of the noted figures. Sectors 12 are further referenced in FIGS. 7, 9, and 10-14. An exemplary payout table 13 for the basic dragon roulette or mahjong roulette according to the present invention is generally depicted and referenced in FIG. 15. Extra payouts for a basic mahjong roulette game are further generally depicted in payout table 17 as illustrated and referenced in FIG. 16.

It is contemplated that the ball-delivery for the basic mahjong roulette game may be the same as in a traditional roulette game insofar as ball-delivery may be by way of an operator or croupier. However, it is further contemplated that ball-delivery may also be achieved by launching balls with an automatic or automated roulette wheel assembly or via any number of inventive ball-delivery means as set forth in more specificity in U.S. patent application Ser. No. 11/711,546, the specification of which is hereby further incorporated by reference thereto. As earlier stated, it may be seen from an inspection of the '546 application that the same sets forth a number of different ball-delivery means usable in combination with the teachings here presented. Further, it is noted that any number of state-of-the-art automated roulette wheel assemblies may be utilized to provide a mahjong roulette gaming experience. Further, it is contemplated that the basic mahjong or dragon roulette_set-up may lend itself to a variation in the form of fully electronic versions or in the form of a mahjong roulette slot machine.

A more elaborate version of the game may be referred to as Grand Dragon (mahjong) Roulette. In this version, it is contemplated that a roulette wheel assembly 11 may be positioned adjacent a fanciful creature 14 such as a dragon as generally depicted in FIG. 1. The fanciful creature 14 may be formed so as to effect a wheel-holding or wheel-guarding pose as generally depicted in the noted figure. The roulette wheel assembly 11 may comprise the basic number (i.e. 42) of circumferentially-aligned mahjong tiles as borne by, or otherwise cooperably associated with, ball-receiving sectors 12 and presented under the opening specifications for basic mahjong roulette. However, it is further contemplated that Grand Dragon Roulette may preferably comprise 144 ball-receiving sectors 12 for receiving and circumferentially aligning 144 tiles as generally illustrated and referenced in FIGS. 6 and 9.

Figure 9:
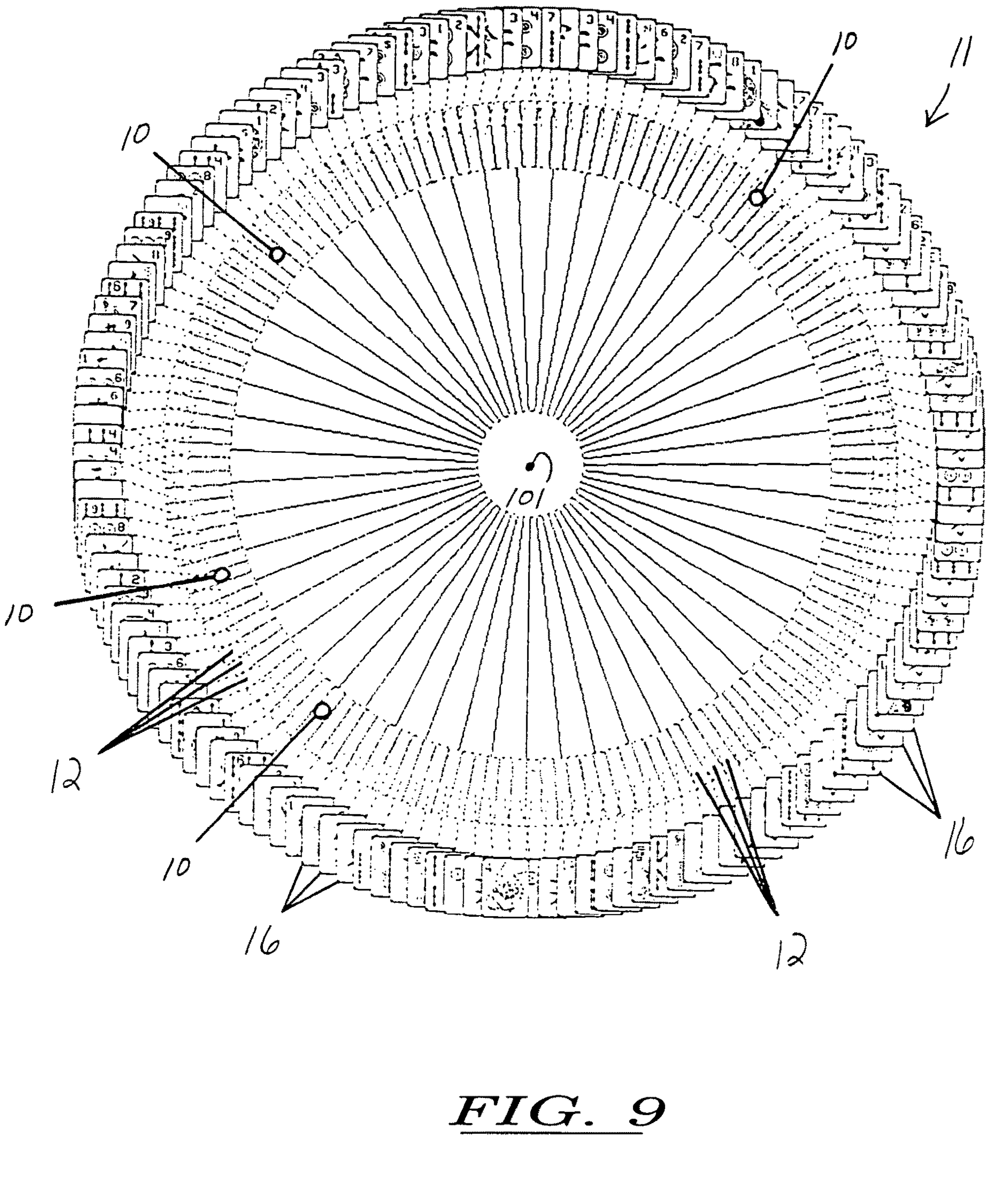
FIG. 9 is a top plan type depiction of an upper wheel surface of a roulette wheel for playing grand dragon mahjong roulette. The figure depicts a total of one hundred forty-four (144) ball-receiving sectors outfittable with the 144 tiles or symbols otherwise depicted in FIG. 6.

FIG. 9 is essentially a skeletal roulette wheel 11 for receiving the tiles or symbols 16 otherwise represented in FIG. 6 and circumferentially arranged as generally depicted. FIG. 9(*a*) depicts a file layout of the 144 tiles or symbols 16 with a file name for each ball-receiving sector 12 otherwise depicted in FIG. 9. It is contemplated that FIG. 9(*a*) sets forth the preferred arrangement of the 144 mahjong symbols 16 left to right and top to bottom. In other words, the right most symbol in a first row is immediately followed by the left most symbol in a second row. For example, referencing Row No. 1 in FIG. 9, the sixth symbol is "cir4" (last position as at reference numeral 40). The seventh symbol is "wan9" and located in Row No. 2 (first position as at reference numeral 41).

In this last regard, it will be recalled that a mahjong game set comprises tiles—of which there are 34 different types. These are the four Winds, namely East, South, West and North; three Dragons, namely, Green, Red and White; Bamboo tiles, numbered one to nine; Circles tiles, numbered one to nine; and Wan tiles, again numbered one to nine. For each of the 34 different tile types there are four identical pieces provided in a mahjong set. The total number of playing tiles in the game is therefore 136 tiles. However in a set there are also eight special tiles that are used solely for the purpose of scoring bonus points, the Flower and Season tiles.

The preferred Grand Dragon roulette table or roulette wheel assembly 11 according to the present invention thus comprises a total of 144 tile-receiving sectors as at 12 in FIG. 9. Notably, FIG. 9 is not specifically illustrated with all 144 symbols actually set upon the tile-receiving sectors 12, but slightly exploded therefrom in circumferential arrangement in order to keep the noted figure relatively clean for enhancing clarity of reference. In this regard, the reader should consider the 144 tiles or symbols 16 as depicted in FIG. 6, which tiles may be circumferentially aligned or other otherwise cooperably associated with the sectors 12 of the wheel assembly 11 in FIG. 9. The ordering of mahjong tiles depicted in FIG. 6 is called the Symbolic Square of Mahjong, which symbolic square formally orders all 144 tiles in the game.

From a comparative inspection of FIGS. 6 and 9, it may be readily understood that the roulette wheel assembly 11 of the Grand Dragon roulette game preferably comprises 144 slots or ball-receiving sectors 12 and each one of those sectors 12 is assigned a single mahjong symbol 16. This game accounts for all of the 144 symbols that can be used in the traditional game of mahjong. The game requires the use of four (4) roulette balls 10 launched upon the upper wheel surface substantially simultaneously. Because the Grand Dragon Roulette version may require multiple roulette balls 10, is contemplated that this version of the game may require certain specialized multi-ball delivery means.

In this regard, it is noted that this application claims the benefit of the '546 application, which application substantially sets forth a number of multi-ball delivery means. The specification of the '546 application more fully supports of the notion that multiple balls may be delivered to the upper wheel surface. In addition to those means set forth in the '546 application, it is contemplated that certain state of the art automated ball-delivery means, and so-called "slingshot" type ball-delivery means may also be utilized to provide ball-launching means for the present invention. So-called "slingshot" ball delivery means may be exemplified by products manufactured and sold under the same brand or utility driven name by CAMMEGH LIMITED with current business address of Old Surrender Manor, Bethersden, Ashford, Kent TN26 3DL, Great Britain.

Notably, this patent application further claims the benefit of U.S. patent application Ser. No. 11/634,780 ('780 application), filed in the United States Patent and Trademark Office on Dec. 5, 2006, and U.S. patent application Ser. No. 11/711,374 ('374 application) (a continuing application of the '780 application), filed in the United States Patent and Trademark Office on Feb. 22, 2007. The subject patent applications also set forth a roulette medium for effecting non-numeric, symbol-based roulette gaming. The '780 and '374 applications thus bear a strong resemblance to the present teachings and the specifications of the noted applications are thus hereby incorporated by reference thereto as being supportive of the concepts here delineated. More specifically, whereas the symbols in the '780 and '374 applications tend to support syllable formation and word formation as a means to enhance the gaming experience, the symbols of the present application tend to support grouped symbol, tile, or card formation in which the symbols have multi-dimensional underlying cultural meaning. In this regard, it is noted that grouped tiles or grouped cards are often referred to as a "hand" to use a well-known gaming vernacular, and this it is contemplated that the present invention supports a system, apparatus, and method for dealing or forming a hand, which hand may comprise a number of symbolic tiles or cards and thereby elicit or effect a certain gaming effect.

Figure 14:
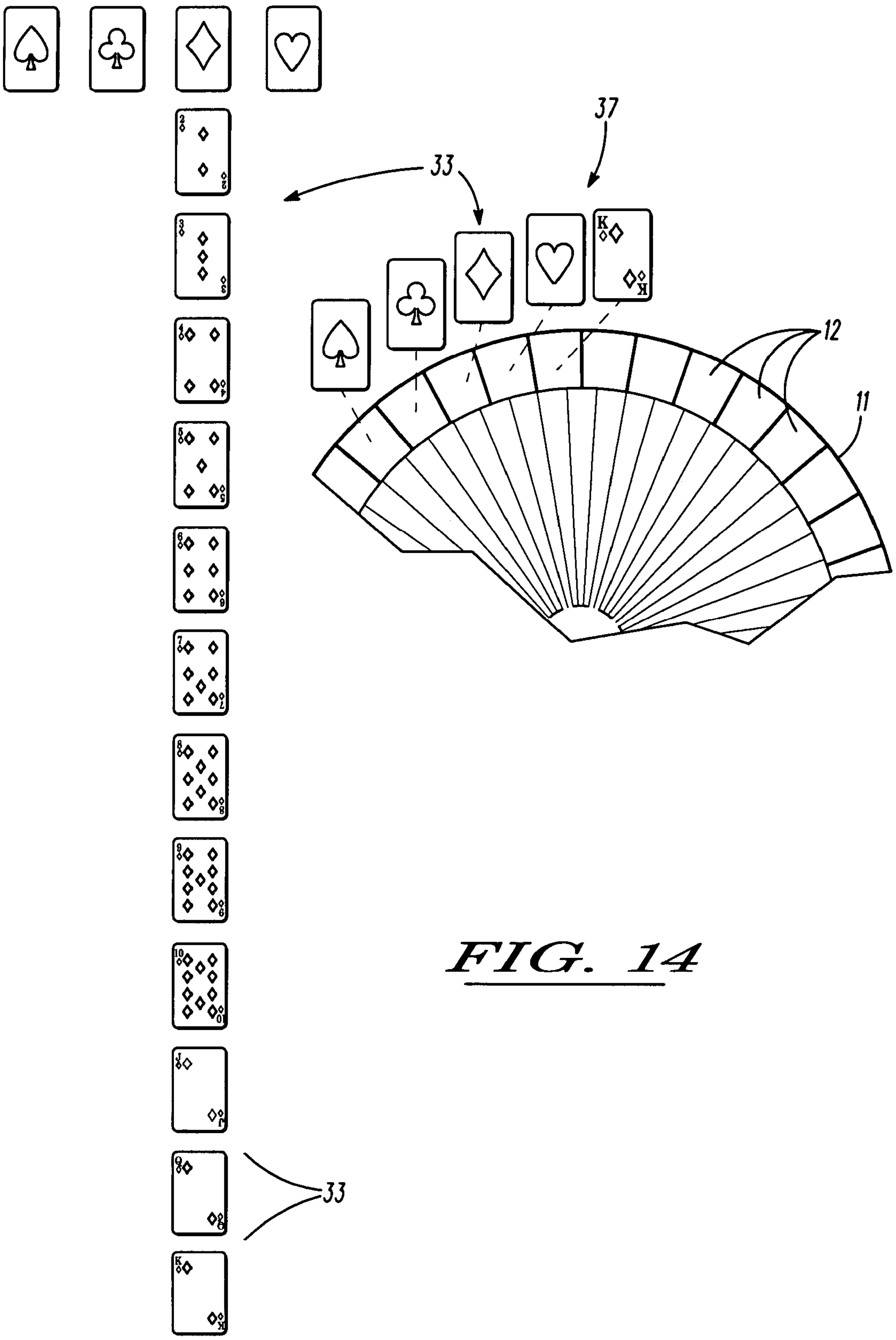
FIG. 14 is a fragmentary top plan type depiction of an alternative embodiment of the roulette wheel adjacent a partially presented traditional playing card deck showing traditional playing card symbols associated with the ball-receiving sectors.

For example, a four-ball game according to the present invention may thus ball-identify four tiles as generally depicted in FIG. 9, and a five-ball game according the present invention may identify five cards or tiles (as for example, may be practiced by way of a typical playing card deck (comprising fifty-two total cards with four suits and thirteen cards in each suit) as generally depicted in FIG. 14. The odds of securing any given five-card hand by way of a traditional playing card deck are well known in the arts and thus it is contemplated that payout structures for this type of structure need not be presented here.

Multi-wheel, multi-ball mahjong roulette may be exemplified by the structures generally illustrated and referenced in FIGS. 2-5, and 10-13, inclusive. From an inspection of the noted figures, it is contemplated that the multi-wheel, multi-ball version of mahjong roulette contemplates four roulette wheels 11 and four roulette balls 10 (respectively identified in the four FIGS. 10, 11, 12, and 13), in which one roulette ball 10 is launchable upon each roulette wheel 11. This variation may be preferably defined by four roulette wheels 11 with thirty-six ball-receiving sectors 12 on each wheel 11. From an inspection of the noted figures, it may be readily seen that each respective roulette wheel 11 preferably comprises thirty-four identical same symbols 16 (arranged in differing arrangements), while further comprising a unique Season and Flower tile on each of the four roulette wheels 11. An exemplary four-ball payout table 18 is generally illustrated and referenced in FIG. 17.

With FIG. 17 in view, the following points should be noted: the overall jackpot is 5.79606%. With most prized structured around 90%, this gives a total player return around 96%. The winner selection method occurs in two stages in which the game outcome (i.e. Kong or Pung) determines that a jackpot is won and the mystery jackpot winner selection methodology (set forth in more detail in the '780 and '374 applications) is used to select a winner with probability in proportion to the amount bet. It is contemplated that start-up bets may be relatively low. To compensate for this, a portion of each jackpot will be held in Reserve Pools (0.05% and 0.1% respectively) such that when a jackpot is won, the Reserve Pool is transferred to the next jackpot on top of the start-up prize. The timeframe for winning these jackpots, based upon an estimated game rate of one game per minute is, as follows:

Kong: about every 34 days (the jackpot growing ever larger in the interim);

Dragon/Wind Pung: about every 4 hours; and

Suit Pung: about every 16 minutes.

It is contemplated that one way to improve the foregoing rates and thus increase or enhance the overall gaming excitement (with rapidly incrementing jackpot pools), is to link multiple tables, each with their own set of roulette wheels, to a common jackpot. If, for example, eight tables were to be linked to a common jackpot, the foregoing hit rates may reduce, as follows:

Kong: about every 4.25 days;

Dragon/Wind Pung: about every 30 minutes; and

Suit Pung: about every 2 minutes.

FIG. 18 generally depicts the results of seven rounds of four-ball mahjong roulette gaming. It may be readily seen from an inspection of FIG. 18 that during the first sample round, Ball No. 1 hit or identified a Green Dragon; Ball No. 2 identified a Red Dragon; Ball No. 3 identified a Green Dragon; and Ball No. 4 identified a Circlet. FIG. 19 then depicts the bets/payouts depending on the bet. For example, from a comparative inspection of the noted figures, it may be seen that a Green Dragon straight with hit 1 would pay back 32 for every unit bet (i.e. 31 to 1 or 32 for 1). Further, with different results, it should be noted that "suit pung", "dragon/ wind pung", and "kong" jackpots could also be paid out according to the mystery jackpot prize.

It is contemplated that the mahjong or symbolic roulette gaming of the present invention may well be played by way of a multi-terminal game as well as one that can be adapted for mobile device(s), such as a notebook computer 20, a touch screen liquid crystal display (LCD) monitor 50, or other hand held data input-output device such as a personal digital assistant (PDA) 21 as generically depicted and referenced in FIG. 4. It is noted that a touch screen LCD monitor 50 such as the type generally depicted in FIG. 4 is more feasible option in a casino or gaming establishment and thus may define the preferred interface for player(s) 100. It is further noted that player(s) 100 are often desirous of visualizing how winning combinations are effected (i.e. ball-effected through a roulette medium) because of suspicions of results obtained through a random number-symbol generator. Although a random number or symbol generator would be at the heart of electronic versions, it is contemplated that certain facets of the present teachings could well be practiced with fully electronic version(s).

Figure 2:
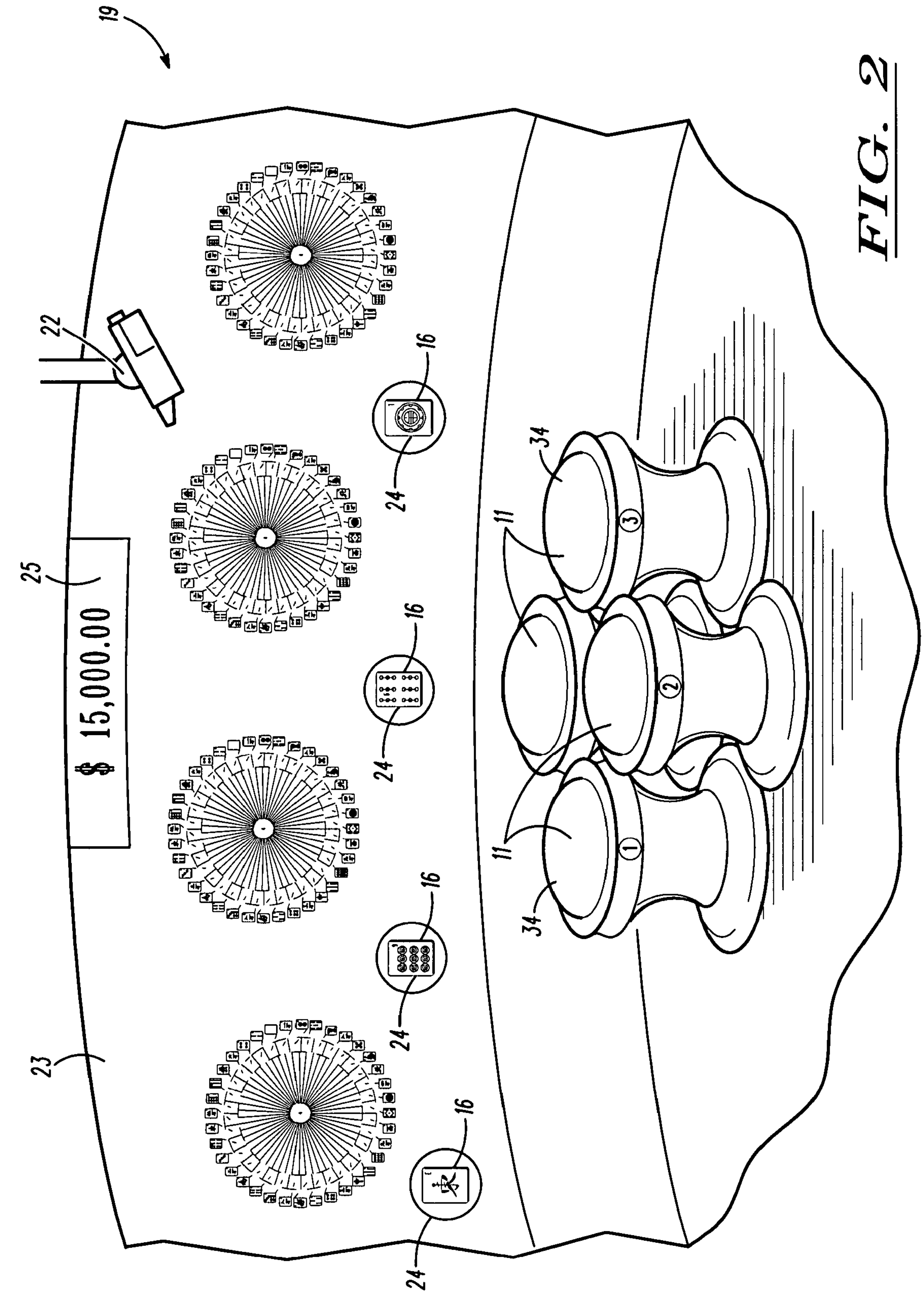
FIG. 2 is a fragmentary top perspective type depiction of a roulette gaming system of the present invention depicting a centralized, grouped series of automated roulette wheel assemblies, visual displays of the individual roulette wheel assemblies, visual displays of ball-identified symbols, and a visual display of a jackpot award.
Figure 3:
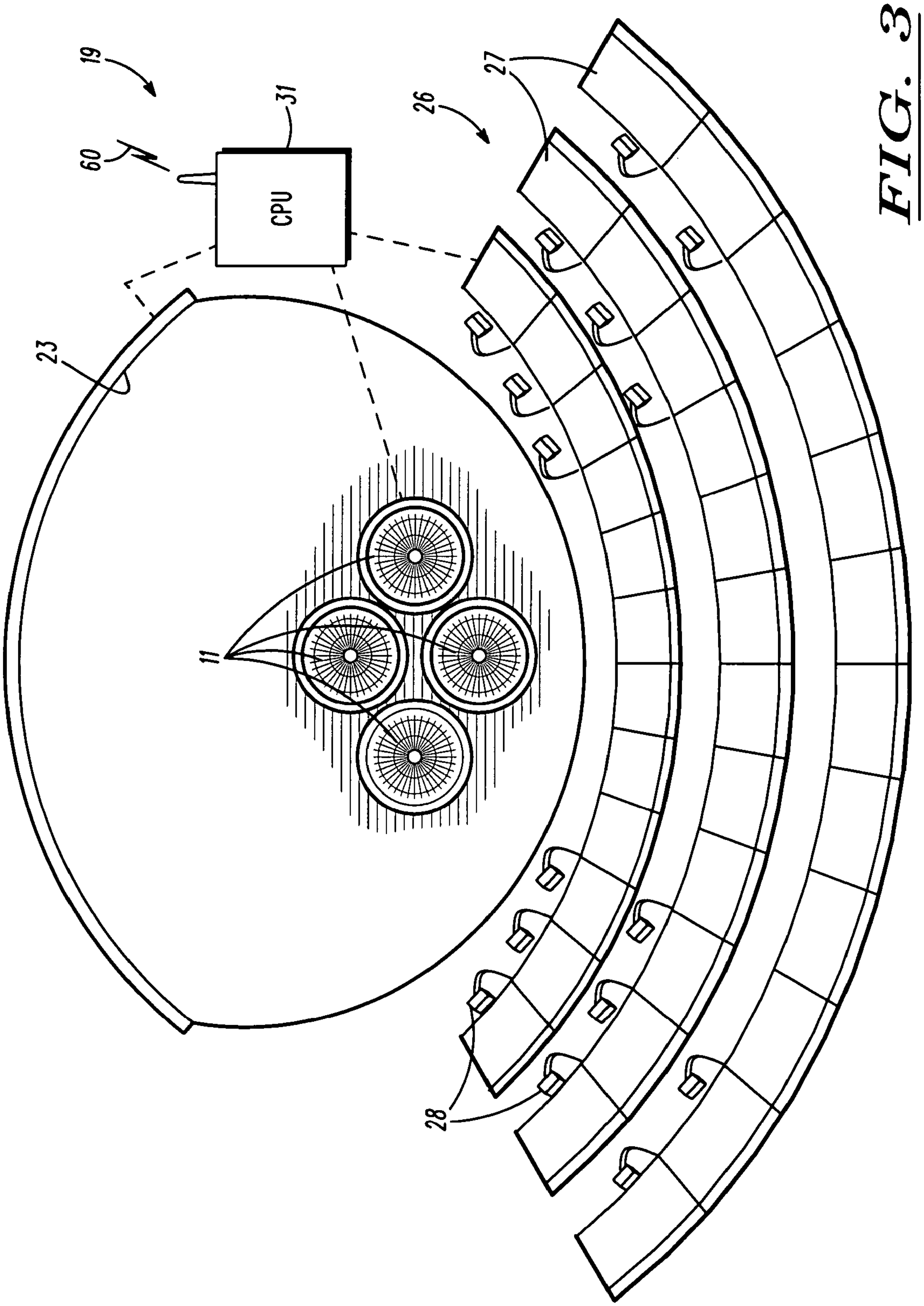
FIG. 3 is a top plan type depiction of the roulette gaming system otherwise depicted in FIG. 2 depicting a centralized, grouped series of automated roulette wheel assemblies, a rearward visual display portion, and a forward, theater or auditorium style player participation area.

A further embodiment of the present invention contemplates centralizing a grouped series of roulette wheel assemblies 11 in a theater o auditorium style setting 19 as generally depicted in FIGS. 2-4. The grouped series of (preferably automated) roulette wheel assemblies 11 are preferably viewable from above as enabled, for example, via certain visual display means. It is contemplated that the visual display means may be defined by certain visual input means such as camera type hardware 22 as generically illustrated and referenced in FIG. 2; and certain visual output means such as one or more visual display screen(s) 23 as further generically illustrated and depicted in FIGS. 2 and 3.

It is contemplated that the visual display means may function to visually display each separate roulette wheel assembly 11 in a grouped series of roulette wheel assemblies 11 as well as being operable to train in on the ball-identified sectors 12 and symbols 16 and display the same in individualized screens as at reference numeral 24 in FIGS. 2 and 4. In this regard, it is contemplated that the roulette balls 10 are thus operable to ball-effect a mahjong event or similar other type symbolic event (i.e. a multi-tile or multi-card episode defined by the grouped symbols 16 or cards identified by roulette balls 10 coming to rest in ball-receiving sectors 12).

As earlier noted, it is preferred that the roulette wheel assemblies 11 be automated via state-of-the-art automation means. To the rear of the grouped series of roulette wheel assemblies 11, a large screen 23 may also visually display the results (as at 24) and jackpot (as at 25) for any given gaming episode. In addition to the results 24 and the jackpot 25, it is further contemplated that peripheral type symbols and animation may be displayed relating, which symbols and animation relate to mahjong and/or Chinese culture. Said visual displays could also be utilized as an advertising medium at the election of the gaming house or provider.

Opposite the visual output display(s) or visual display screen 23, players may participate in the gaming event(s) in a player participation area as at 26. The player participation area 26 may be preferably defined by comprising auditorium or theater type seating 27 as generally illustrated and depicted in FIGS. 3 and 4. From an inspection of the noted figures, it may be readily understood that players (as at 100) may congregate in the participation area and utilize individualized data input means 28 for placing wagers on the gaming event and tracking debits/credits resulting from the wagering and gaming event(s). Notably, there is no table as such, and the data input means 28 may be preferably defined by notebook computer 20 or by hand-held data input-output device 21.

Given that there is no table per se, it is contemplated that a table layout may be available by way of an animated format on the data input means 28 or visual display means 23 as generally depicted in FIG. 5. It is further contemplated that the means for providing a virtual table layout may also be defined by a state-of-the-art mobile gaming device communicating via state-of-the-art wireless technology. Certain generic depictions of wireless enabled communication(s) are illustrated in FIGS. 3 and 4 at reference numeral 60. It is contemplated that these and similar other devices may well function to enable the player to input credits (for example via a swiped credit card 29 as generally depicted in FIG. 4); place wagers as at 30 and generally depicted in FIG. 4; and enable the player to otherwise track credits and debits during the wagering-gaming events.

U.S. readers may well be familiar with traditional playing card deck comprising four suits (Spades, Clubs, Diamonds, Hearts) with each suit comprising thirteen cards (numbered 1 (or ace) through 10, a Jack (J), a Queen (Q), and a King (K). Similarly, the Mahjong deck comprises (1) Circles (four sets of nine=thirty-six total); (2) Bamboos (four sets of nine=thirty-six total); (3) Wans (characters) (four sets of nine=thirty-six total); (4) Winds (four sets of four=sixteen total); (5) Dragons (four sets of three=twelve total); (6) Flowers (four total); and Seasons (four total).

Figure 7:
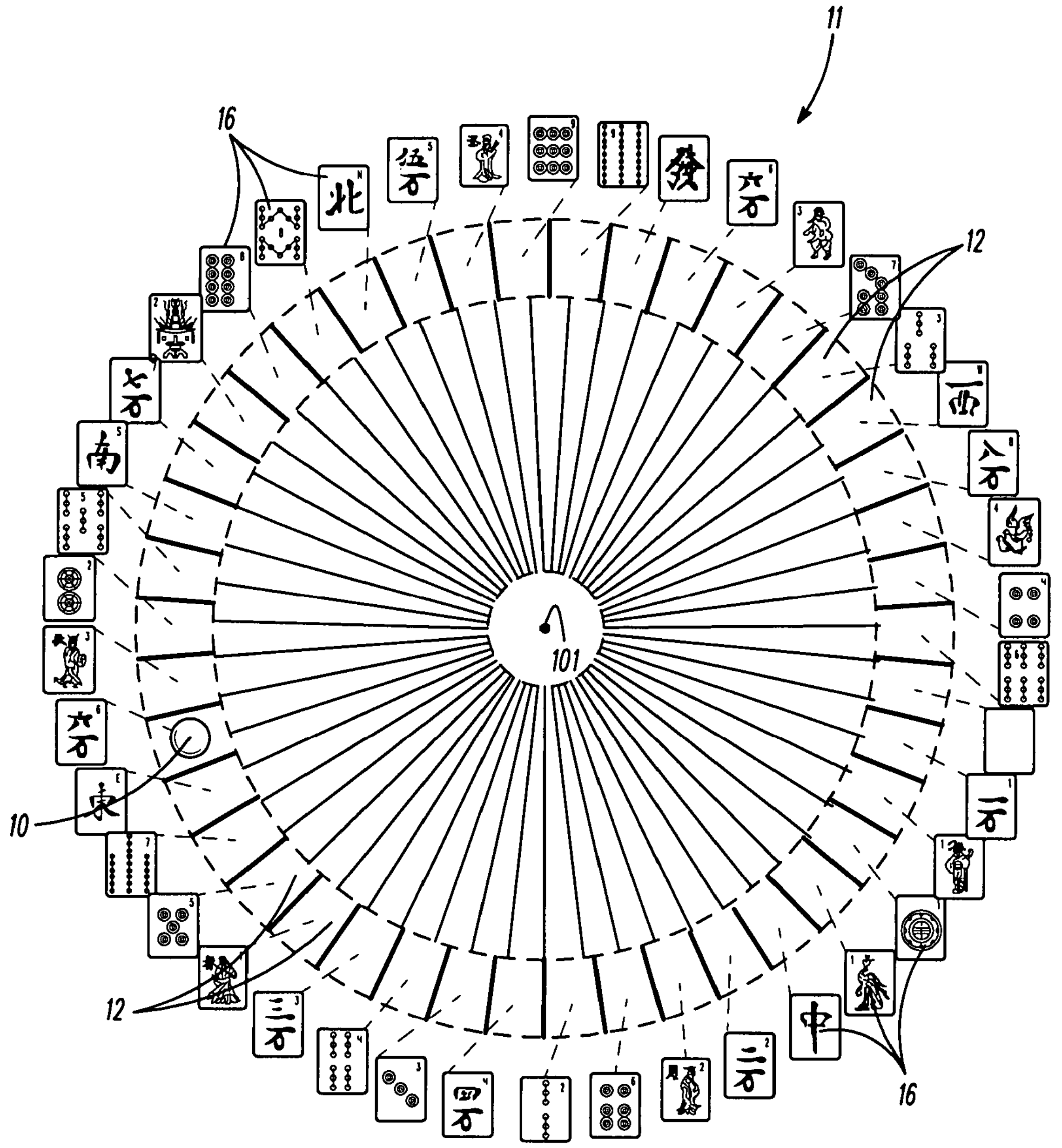
FIG. 7 is a top plan type depiction of an upper wheel surface of a roulette wheel for playing basic mahjong roulette. The figure depicts a total of forty-two tiles or symbols arranged circumferentially around the roulette wheel.
Figure 8:
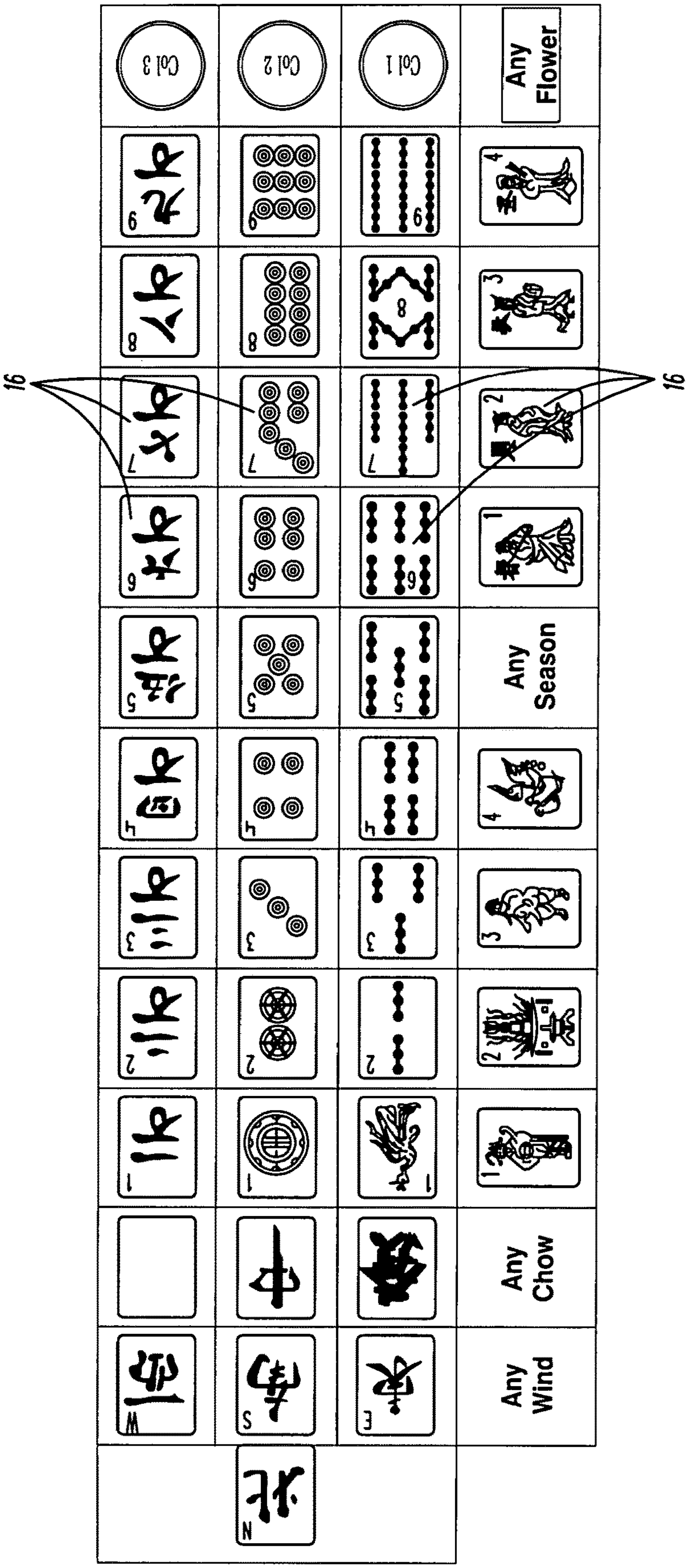
FIG. 8 is a plan type depiction of a first symbolic wagering table depicting the forty-two basic mahjong tiles or symbols and certain additional wagering selections.

The foregoing tiles or cards are represented or set forth in their totality in FIG. 6, which tiles are configurable upon the roulette wheel assembly 11 as generally depicted in FIG. 7. It is contemplated that in the four-ball variation of dragon or mahjong roulette according to the present invention, the basic scoring elements may be defined, as follows: Kong—four of the same tile (i.e. 4 circles, 4 bamboos, 4 wans, 4 like dragons, or 4 like winds); Pung—three of the same tile (i.e. 3 circles, 3 bamboos, 3 wans, 3 like dragons, or 3 like winds); Chow—three in a row of the same suit (e.g. Wan 3, Wan 4, Wan 5); and a "Wind of the Round". For example, if a bet is placed on any wind, and the Wind of the Round was drawn, the prize could be doubled. The Wind of the Round could be selected sequentially or randomly.

Notably, the present teachings set forth a roulette gaming system involving multiple roulette balls 10 for identifying multiple, hand-forming symbols, particularly mahjong symbols16. Roulette gaming involving multiple roulette balls 10 and a progressive jackpot may benefit from certain means for tracking chips and for transferring data to the jackpot controller, as may be governed by centralized processing means or a central processing unit 31 as generally depicted in FIG. 3. In this regard, it is contemplated that a player 100 may complete a transaction either through a cashier or alternatively through a chip dispenser to acquire chips. Via the transaction with the cashier or the chip dispenser, it is contemplated that the player may preferably be identified by way of a player card 32 as generally depicted and referenced in FIG. 4.

The primary purpose of identifying the player 100 through a player card 32 is to enable effective payout delivery to player(s) 100. The chips may well further be outfitted with certain radio frequency identification devices and once they are placed on the dragon mat in a wagering pattern their positions can be tracked. If they are placed on bets that are linked to the progressive/mystery jackpot (as specified in more detail in the '780 and '374 applications), it can be calculated as soon as the transaction is completed (i.e. the chip is placed in position). Side bets not involving a jackpot could be identified in the traditional manner by associating colors with particular players. In the electronic version, or the versions where remote technology is used, the calculations in terms of progressive jackpots and the like may be calculated by the machine. Note that in some variations of purely mystery jackpots, all bets may be eligible to win these jackpot prizes with the probability of winning generally in proportion to the amount wagered.

The preferred practice of the present invention generally involves the combination of roulette and mahjong gaming. In a first preferred practice, it is contemplated the present invention may be said to teach a roulette-gaming system for effecting or providing a multi-wheel roulette gaming experience. In this regard,—it is contemplated that the roulette-gaming system of the present invention may be said to comprise a grouped series of roulette wheel assemblies 11 as generally depicted in FIGS. 2-4; a player participation area 26 as generally depicted in FIGS. 2-4; certain central-processing means as generically depicted as a black box CPU 31 in FIG. 3; and certain visual display means, the output means of which is generally depicted and referenced in FIGS. 2-4 at reference numeral 23, and the input means of which is generally depicted and referenced in FIG. 2 at reference numeral 22.

Each roulette wheel assembly further comprises a roulette wheel; a roulette ball 10; a dome (as at 34 in FIG. 2) for preventing balls 10 from escaping from the roulette wheel(s) 11; certain automated rotation means for rotating the roulette wheel about a wheel axis of rotation as referenced at an axis extending into the page at 101 in FIGS. 7 and 9; certain automated launch means for launching the roulette ball 10; and certain means for automatically identifying in which slots or sectors 12 the roulette ball(s) 10 have landed. In this last regard, the reader is further directed to the '546 application for guidance as to certain means for automatically identifying in which sectors 12 the ball(s) 10 have landed.

Each roulette wheel comprises a plurality of ball-receiving sectors 12 and at least one ball-launching track30 as illustrated and referenced in FIG. 1. Each ball-receiving sector 12 comprises a superior sector surface as at 31, which superior sector surfaces 31 each bear or are otherwise cooperable with a select wheel symbol as may be preferably defined by a mahjong symbol 16 or as may be alternatively defined by similar other symbolism, such as traditional playing card symbols as at 33 in FIG. 14. The roulette balls are respectively launchable from the ball-launching tracks 30 and respectively receivable in one of the ball-receiving sectors 12 for providing a multi-sector event. The multi-sector event may be defined by the group of symbols identified by the balls as they come to rest in the ball-receiving sectors 12.

Figure 10:
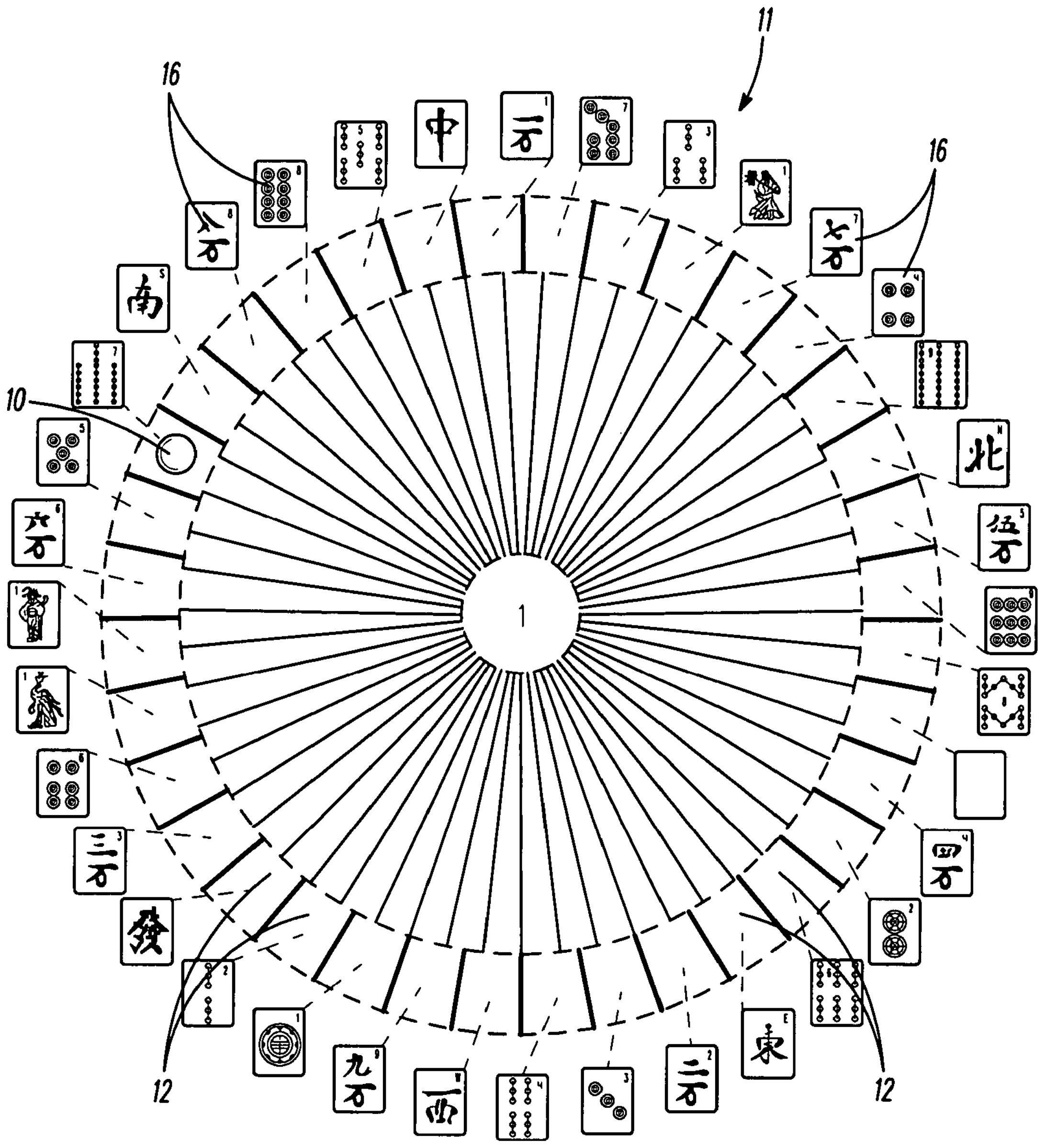
FIG. 10 is a top plan type depiction of a first roulette wheel of the grouped series of roulette wheel assemblies otherwise depicted in FIGS. 2-4 showing a total of thirty-six tiles or symbols circumferentially arranged and a roulette ball identifying the "bamboo7" symbol.
Figure 11:
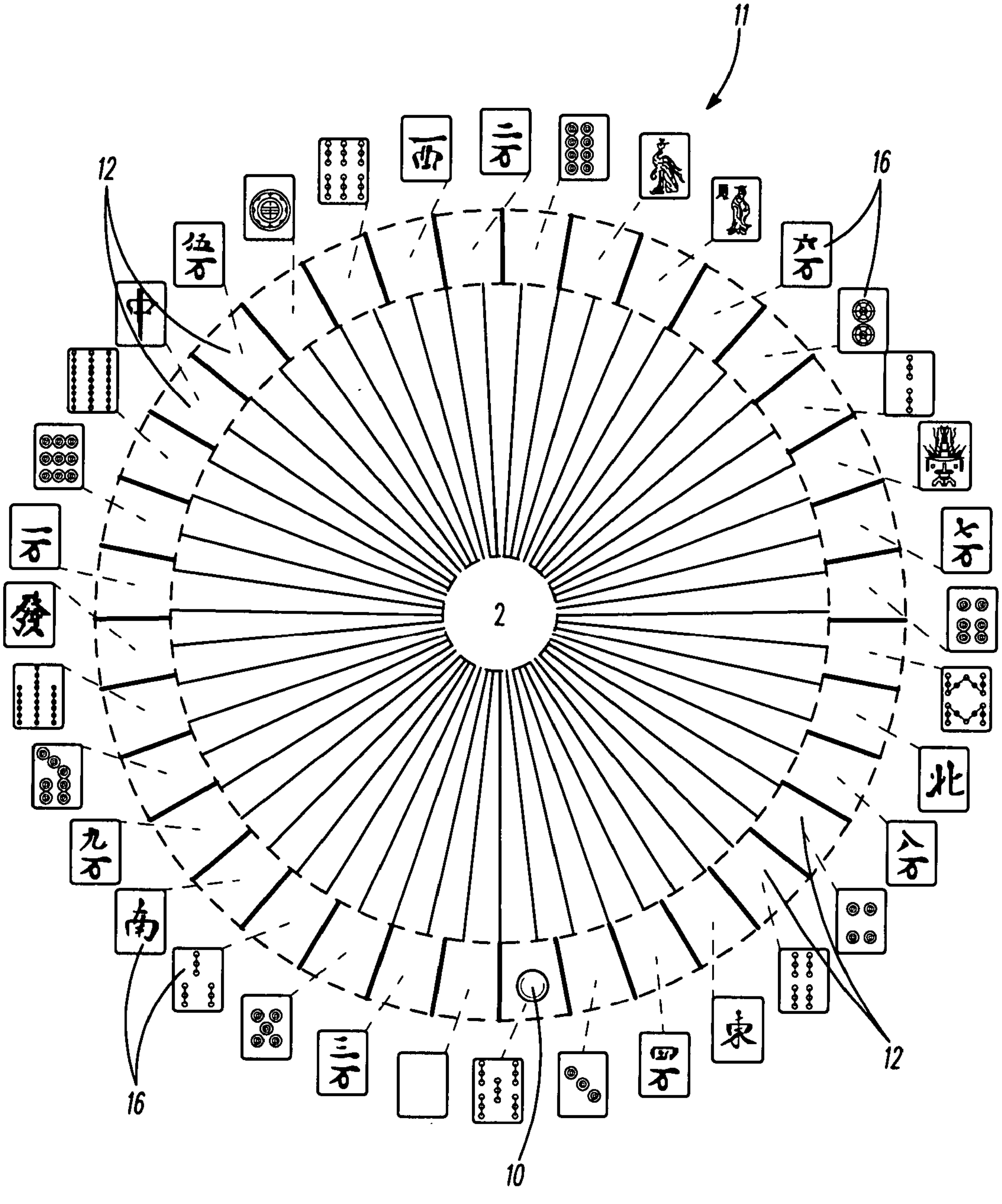
FIG. 11 is a top plan type depiction of a second roulette wheel of the grouped series of roulette wheel assemblies otherwise depicted in FIGS. 2-4 showing a total of thirty-six tiles or symbols circumferentially arranged and a roulette ball identifying the "bamboos" symbol.
Figure 12:
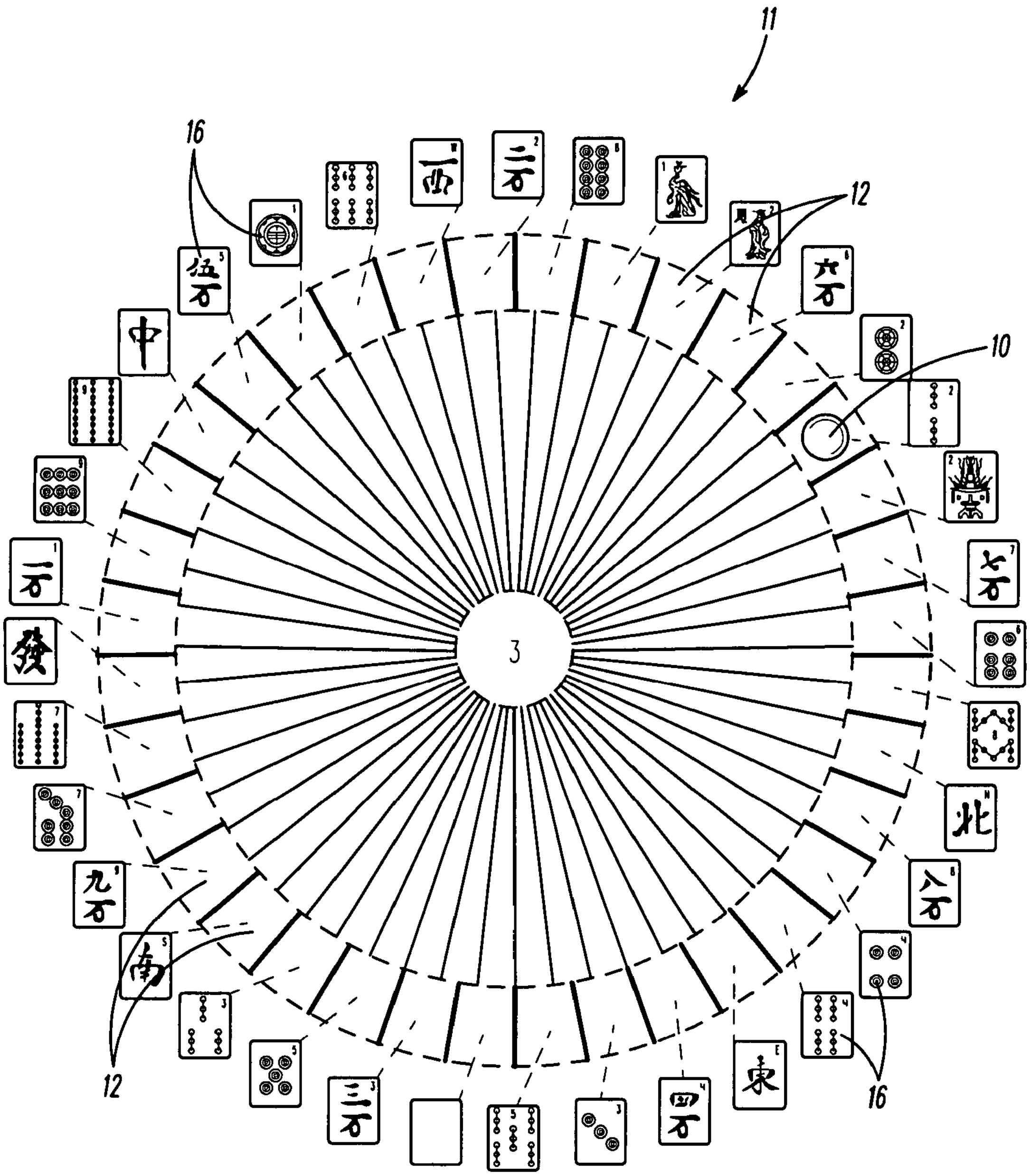
FIG. 12 is a top plan type depiction of a third roulette wheel of the grouped series of roulette wheel assemblies otherwise depicted in FIGS. 2-4 showing a total of thirty-six tiles or symbols circumferentially arranged and a roulette ball identifying the "bamboo2" symbol.
Figure 13:
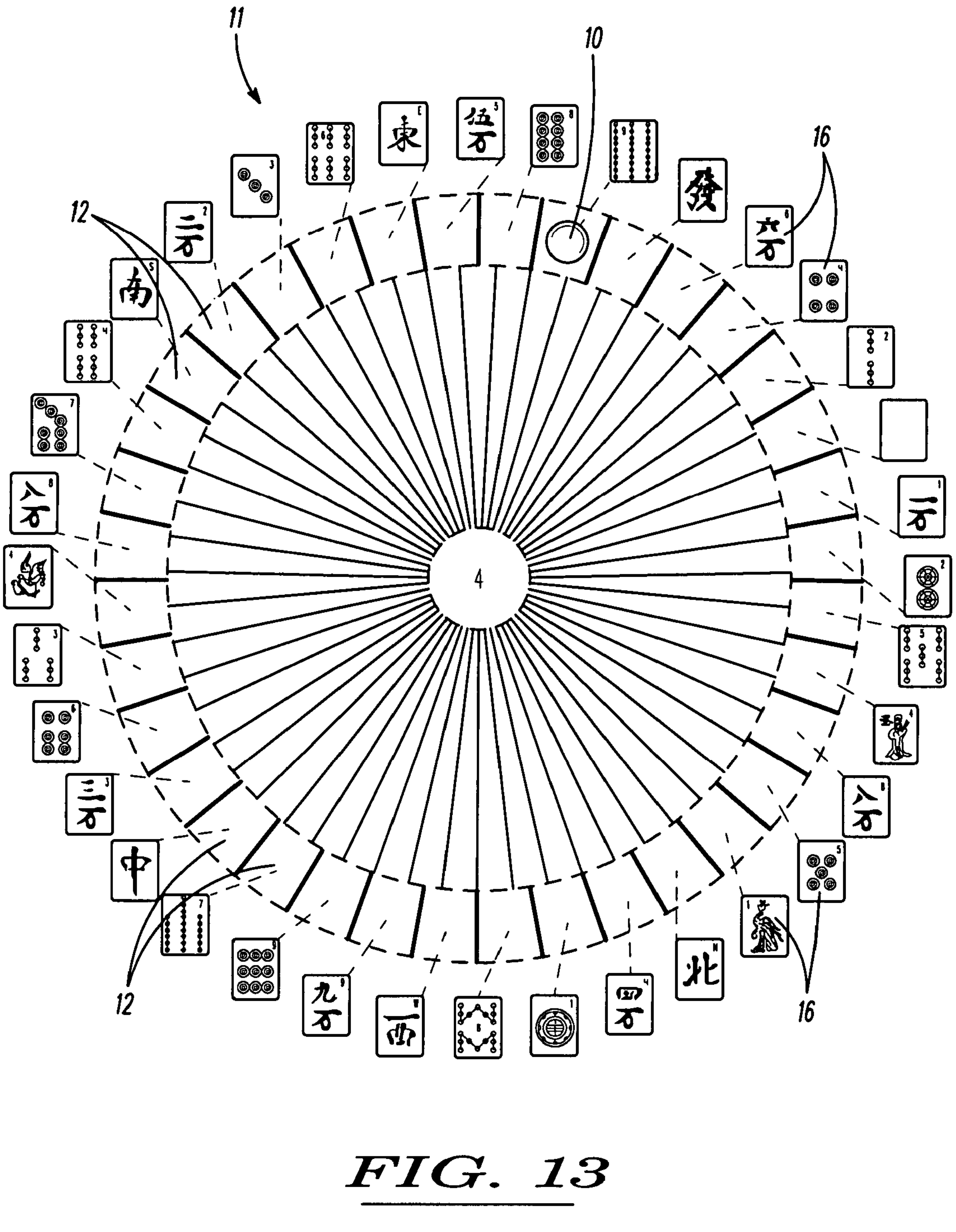
FIG. 13 is a top plan type depiction of a fourth roulette wheel of the grouped series of roulette wheel assemblies otherwise depicted in FIGS. 2-4 showing a total of thirty-six tiles or symbols circumferentially arranged and a roulette ball identifying the "bamboo9" symbol.

In this last regard, the reader is directed to FIGS. 10-13, inclusive. FIGS. 10-13 depict a collective group of four mahjong-tiled roulette wheels (as otherwise depicted in FIGS. 2-4). Wheel No. 1 is generally depicted in FIG. 10 and has been illustrated to ball-identify a 7 wan character. Wheel No. 2 is generally depicted in FIG. 11 and has illustrated to ball-identify a 5 wan character. Wheel No. 3 is generally depicted in FIG. 12 and has been illustrated to ball-identify a 2 wan character. Wheel No. 4 is generally depicted in FIG. 13 and has been illustrated to ball-identify a 9 wan character. In this example, the multi-sector event may thus be defined as a 7 bamboo, 5 bamboo, 2 bamboo, 9 bamboo event. If a player 100 had been wagering on this combination of symbols 16, he or she may have done so because of some underlying meaning to that player. It should be noted that each mahjong symbol 16 has meaning, and in this example, the combination of symbols 16 provides a story of sorts.

For example, in the foregoing example, a 7 bamboo represents the Chinese character: "Kuei". This character is symbolized by the tortoise, and often indicates dissatisfaction with the length of time that is being taken to resolve an issue. The tile therefore signifies that thought is required and that progress will be achieved gradually. It is also a symbol of longevity, given the great age that a tortoise can achieve. The tortoise is one of the four great Chinese astrological constellations covering the Northern part of the sky and is therefore associated with the North Wind, Winter and Water. The 5 bamboo represents the Chinese character: "Lien". This character is symbolized by the lotus flower and represents new birth, possibly a spiritual awakening, or on a more material level, the birth of a child. It can also suggest regeneration following an experience of extreme or endured hardship, indicating that there is a need to come to terms with the present and begin life anew.

The 2 bamboo represents the Chinese character: "Ya". This character is represented by the duck—the Chinese believe that a pair of ducks remains together for life, so the symbolism of the duck is an enduring partnership and/or fidelity. Finally, the 9 bamboo represents the Chinese character: "Liu". This character is symbolized by the willow tree; its meaning is strength through flexibility, in a word—diplomacy. This is because the willow bends to the wind during winter, survives, and once more flourishes again upright and strong in the spring. The player 100 who wagers this event may thus be seeking longevity (7 bamboo), spiritual awakening (5 bamboo), and diplomatic (9 bamboo) monogamy (2 bamboo). The mahjong roulette medium provides a means for ball-effecting or ball-eliciting a multi-sector event or mahjong event as exemplified by the foregoing example. FIG. 2, by way of comparison, depicts an East wind, a 9-circles, a 6-bamboo, and a I-circle event as shown in the sector-displaying screens 24.

The player participation area 26 is believed to enable grouped player participation and is spatially separated from the roulette wheel assemblies as generally depicted in FIGS. 2-4. The player participation area preferably comprises wager-inputting means for enabling electronic entry of wagers, which wagers identify select wager symbols. Together, the wheel symbols and wager symbols have paired symbol correspondence for yielding a win event. The central processing means essentially function to (1) collect the wagers, (2) govern the automated rotation and launch means, (3) compare the wagers to the multi-sector event, (4) calculate payouts to players should a wager match the multi-sector event, and (5) govern credits-debits during roulette gaming. It may be readily seen from an inspection of FIG. 3 that the central processing means as generically depicted at CPU 31 is a hub interconnecting the features of the system.

The visual display means essentially function to visually display activity at the grouped series of roulette wheel assemblies or grouped roulette wheel assembly action (comprising the multi-sector event) to the player participation area 26. It will be recalled that the player participation area 26 is spatially separated from the site of wheel action and thus the visual display means may well function to add excitement to the roulette gaming experience by enabling theatrical or cinematic type viewing of the gaming events. The grouped roulette wheel assembly action may be said to further comprise wheel rotations, roulette ball action, and, as noted, the multi-sector event. As earlier specified, this display could be via either a large, centralized screen in an auditorium type area or via individualized screens 36 at player seats or stations as generally depicted in FIGS. 4 and 5.

It is contemplated that in the preferred embodiment, the wheel symbols and the wagerable symbols are defined by mahjong symbols and that the automated launch means comprise certain ball-conducting conduit for converting a potentially energetic roulette ball 10 to a kinetically energetic roulette ball 10 and for outletting the kinetically energetic roulette ball 10 upon the roulette wheel 11. In this last regard, the reader is directed to the '546 application for a more in-depth discussion regarding a variety of inventive ball-delivery systems usable in combination with the mahjong and/or symbolic roulette features here delineated.

In a second preferred practice, it is contemplated that the present invention essentially teaches a mahjong roulette game for ball-effecting a mahjong event, and which mahjong roulette game comprises a plurality of grouped roulette wheel assemblies and a player participation area. Each roulette wheel assembly comprises a roulette wheel, a roulette ball, means for rotating the wheel, and means for launching the roulette ball. Each roulette wheel comprises a plurality of ball-receiving sectors and at least one ball-launching track. Each ball-receiving sector comprises a superior sector surface bearing a select mahjong wheel symbol. The roulette balls are respectively launchable from the ball-launching tracks and respectively receivable in one of the ball-receiving sectors for providing a multi-symbolic event. The player participation area enables wagering input and comprises select mahjong wager symbols, the wheel and wager symbols having paired symbol correspondence, the paired symbol correspondence, and the multi-symbolic event for effecting a mahjong event.

While the above descriptions set forth certain specificity, this specificity should not be construed as limitations on the scope of the invention, but rather as an exemplification of the invention. For example, as is described hereinabove, it is contemplated that the present invention essentially discloses a mahjong roulette game for ball-effecting a mahjong event. The mahjong roulette game according to the present invention may thus be said to essentially comprise a roulette medium. Essentially, the roulette medium comprises a plurality of ball-receiving sectors and a plurality of balls. Each ball-receiving sector comprises a superior sector surface, the superior sector surfaces each bearing a select mahjong wheel symbol. The roulette balls are respectively receivable in one of the ball-receiving sectors. Together, the select ball-receiving sectors and the roulette balls ball-effecting or ball-elicit a mahjong event.

Stated another way, the roulette game of the present invention may be said to ball-effect or ball-elicit a hand event, which hand event is akin to a multi-sector event or mahjong event in the sense that multiple cards or tiles, when grouped or dealt via a roulette medium, may yield a hand. In this regard, it is contemplated that the roulette game essentially comprises a grouped series of roulette wheel assemblies, wherein each roulette wheel assembly comprises a roulette wheel and a roulette ball. Each roulette wheel comprises a plurality of ball-receiving sectors, and each ball-receiving sector comprises a select hand-forming card. The roulette balls are respectively receivable in one of the ball-receiving sectors for effecting a multi-card hand event. Alternatively, the game may be said to teach or support a roulette card game for ball-effecting a hand event in which the card game comprises a roulette wheel assembly having a roulette wheel and a plurality of roulette balls. The roulette wheel comprises a plurality of ball-receiving sectors and each ball-receiving sector comprises a select hand-forming card. The roulette balls are respectively receivable in one of the ball-receiving sectors for effecting a multi-card hand event.

The roulette game may thus well operate to effect a wagerable hand event and comprise a roulette medium having a plurality of ball-receiving sectors and a plurality of balls. The ball-receiving sectors may preferably comprise certain select hand-forming symbolism such as mahjong symbols or traditional playing card symbolism, well known in the gaming arts. The roulette balls are respectively receivable in the ball-receiving sectors for ball-effecting a wagerable hand event, such as the formation of a Royal Flush or four of a kind as generally depicted in FIG. 14 at 37.

Figure 20:
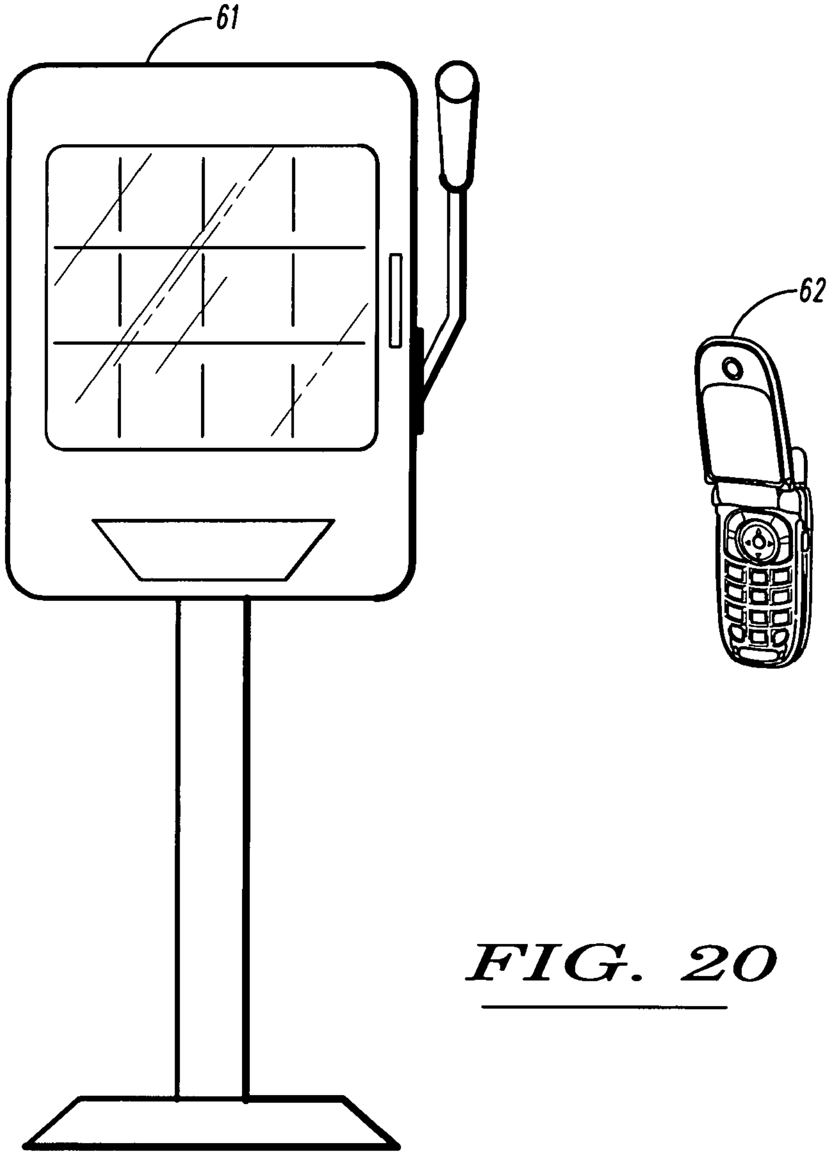
FIG. 20 is a generic depiction of a slot machine and a cellular telephone as exemplary of electronic gaming devices.

A further embodiment of the present invention contemplates the game operating in a stand-alone manner on an electronic gaming device. This device might be a standard slot machine 61 as generically illustrated and referenced in FIG. 20; a handheld mobile terminal or personal digital assistant (PDA) as at 21; a cell phone as generically illustrated and referenced at 62 in FIG. 20; or similar other electronic gaming device. Each such gaming device would preferably comprise certain random number generating means for generating game results, and which means may be preferably defined by (1) a random number generator or (2) access to a random number generator. It is contemplated that the random number generating means may well function to generate game outcome slot(s) for the simulated dragon roulette game.

Figure 15:
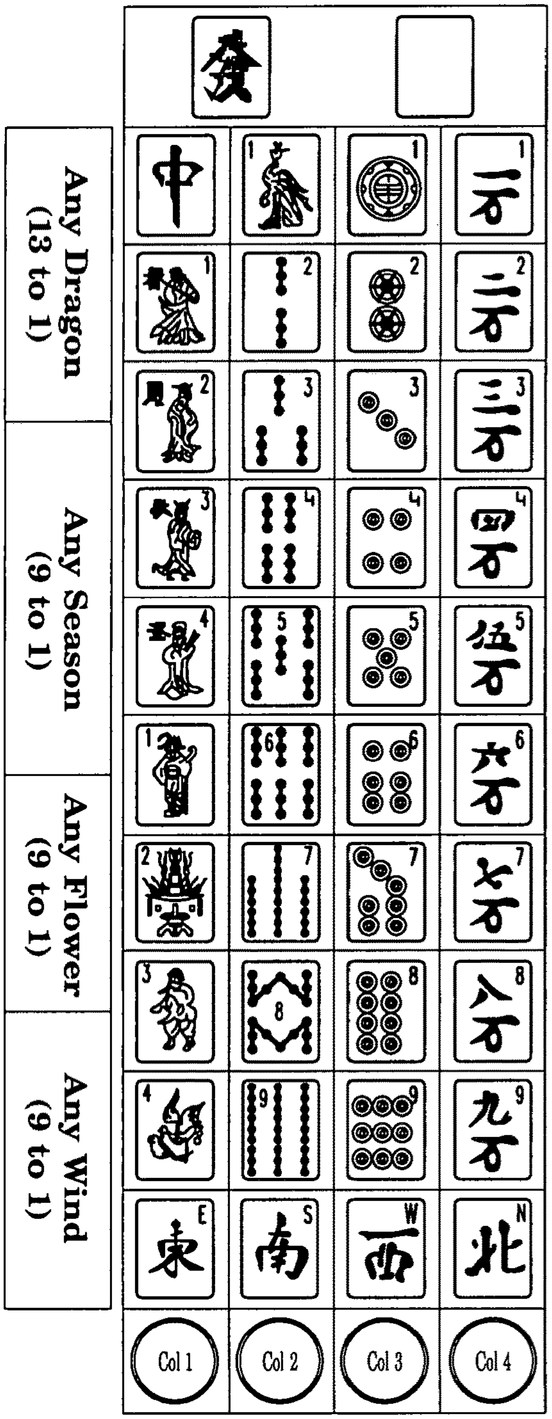
FIG. 15 is a first payout table as positioned adjacent a second symbolic table for basic mahjong roulette or roulette comprising forty-two ball-receiving sectors with a breakdown of various possible wager selections.
Figure 16:
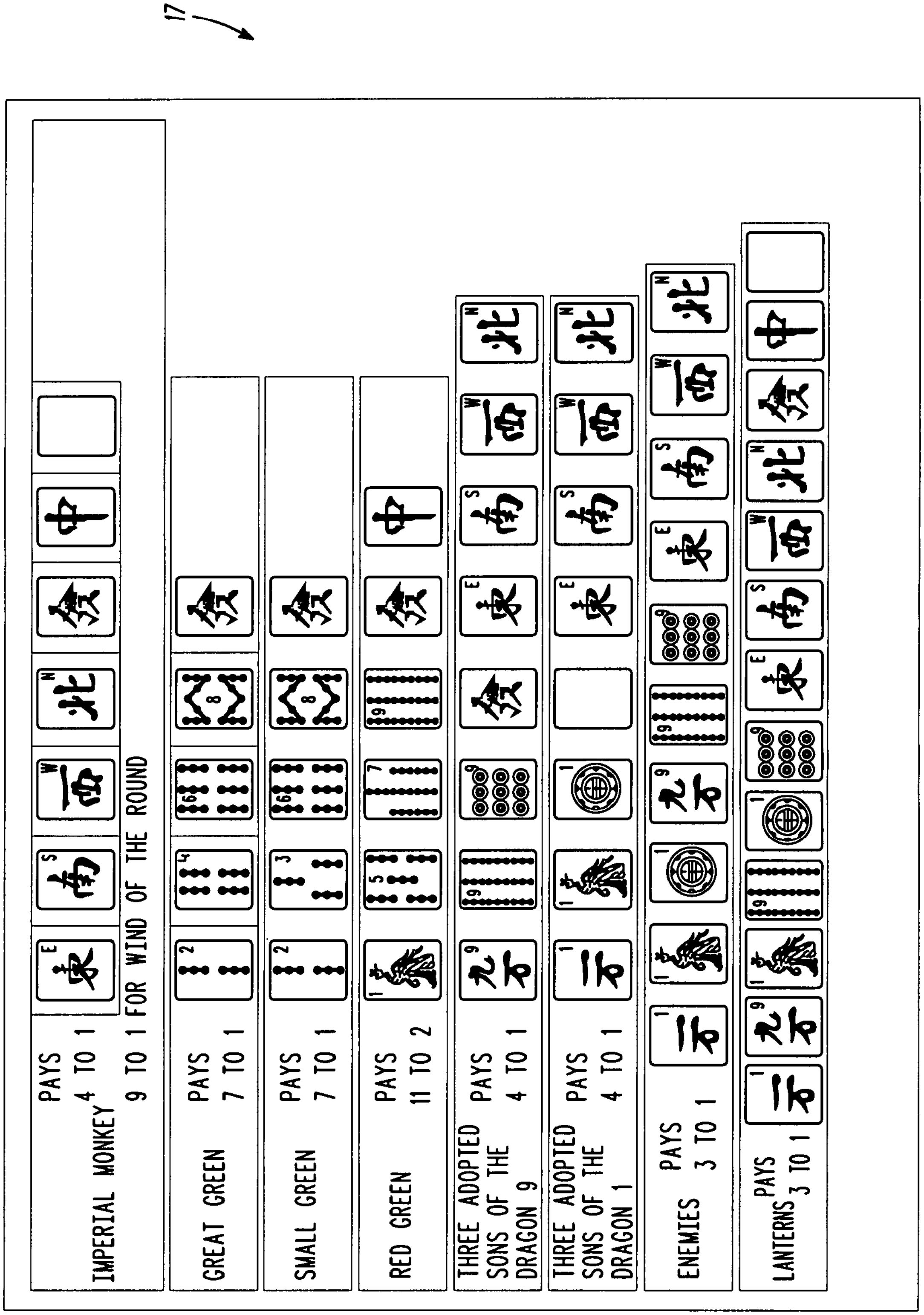
FIG. 16 is a second payout table for basic mahjong roulette or roulette comprising forty-two ball-receiving sectors with a breakdown of various possible wager selections.

It is contemplated that in its simplest form, the one-wheel 11/one-ball 10 game would be made available to the player 100. It is further contemplated that the betting layout would be as generally depicted in FIG. 15, as would the payouts depicted in FIG. 15. The player would use buttons or a touch screen to select wagering options. When "play" is initiated by the player 100, a simulated wheel as exemplified by the wheel 11 in FIG. 7 would be spun and a simulated ball as exemplified by the ball in FIG. 7 would be depicted as spinning around the simulated wheel and coming to rest in a simulated sector. If the simulated ball were to land in a sector wagered by the player, payouts would be added to a credit meter as at 63 in FIG. 5, or via a hand pay initiated for relatively large winnings. As stated, the payout table might be as exemplified in FIG. 15, or alternatively, it might be reduced and/or modified as gaming devices generally return on the order of 90-92%.

A more exciting form for this aspect of the invention will be the four-ball roulette game. This can be the 144-slot simulated wheel and four simulated balls being spun as otherwise generally depicted in FIG. 9. Alternatively, the representation could be four wheels of 36 slots each with a single ball spin simulated on each, as otherwise generally depicted in FIGS. 10-13. The winner selection process would be identical to the multi-sector event as earlier set forth in this paper. The payout table could be the one shown in FIG. 17 as standalone gaming devices generally return on the order of 90-92%.

The main advantage of the four ball multi-sector event is that the gaming device can be linked into common progressive jackpot(s). This provides excitement in the form of many additional players and translates into rapidly incrementing progressives and also the frequency of progressive trigger hits would be much greater and hence the excitement of the frequent winning of the jackpots created. For example, if one hundred gaming devices were linked to a common jackpot and each was paying at the rate of once every 5 seconds, there would be 20 results per second which could mean that the major "Kong" jackpot could be hit as frequently as once every 40 minutes and the others commensurately more frequent.

The gaming devices could be linked to a standard jackpot controller which would perform the accumulation of the individual progressives, drive the overhead displays, and payout the winning prizes when jackpot hit events are notified by the gaming device. There is no need for the secondary jackpot winner selection phase in this configuration.

In addition to the game apparatus and such, it is contemplated that the foregoing specifications further support certain roulette gaming methodology. The roulette gaming method according to the present invention may be said to enhance a roulette gaming experience and comprises the initial steps of arranging mahjong symbols 16 in radial adjacency to a central axis as at 101, which central axis may preferably be an axis of rotation. The method comprises a further steps of randomly depositing symbol identifiers (for example roulette balls 10) in radial adjacency to the central axis; identifying a plurality of mahjong symbols 16 via the deposited symbol identifiers; and effecting a multi-symbolic event via the identified mahjong symbols. It should be noted that the mahjong symbol arrangement is preferably rotatable about the axis of rotation to facilitate random symbol identifier deposition. It should be further noted or recalled that mahjong symbols 16 tell a story, and the essential roulette medium provides a unique way to tell a mahjong story. Additional steps may include predicting the multi-symbolic event before randomly depositing symbol identifiers in radial adjacency to the axis of rotation; wagering property while predicting the multi-symbolic event; and awarding property after wagering property should the predicted event match the multi-symbolic event.

It is further contemplated that the roulette medium may well operate to effect a hand event and thus not be limited to mahjong symbols, but usable with any deck of cards or tiles. The foregoing specifications describe the use of the roulette medium to effect a four of a kind hand. This is but one example of the type of hand that may be formed via a roulette medium. The method for dealing a hand event according to the present invention may thus be said to comprise the steps of: arranging hand-forming symbols in radial adjacency to a central axis; randomly depositing symbol identifiers in radial adjacency to the central axis; identifying a plurality of hand-forming symbols via the deposited character identifiers; and effecting a dealt hand event via the identified hand-forming symbols.

Accordingly, although the invention has been described by reference to certain preferred embodiments and certain methodology associated therewith, it is not intended that the novel game or gaming methods be limited thereby, but that modifications thereof are intended to be included as falling within the broad scope and spirit of the foregoing disclosure, the following claims, and the appended drawings.

We claim:

1. A roulette-gaming system comprising:

at least one processor configured to detect wagers on selected ones of predetermined Mahjong events, thereby resulting in wagered Mahjong events;

a first mechanical roulette wheel including a first plurality of ball-receiving sectors, each of the first plurality of ball-receiving sectors associated with a select Mahjong symbol, and configured to receive a first ball in any one of the first plurality of ball-receiving sectors; and a second mechanical roulette wheel including a second plurality of ball-receiving sectors, each of the second plurality of ball-receiving sectors associated with a select Mahjong symbol, and configured to receive a second ball in any one of the second plurality of ball-receiving sectors, wherein the roulette-gaming system provides a Mahjong event, the Mahjong event based at least in part on a first particular Mahjong symbol associated with the any one of the first plurality of ball-receiving sectors that receives the first ball, and on a second particular Mahjong symbol associated with the any one of the second plurality of ball-receiving sectors that receives the second ball, and wherein the at least one processor is further configured to:

determine if the Mahjong event provided by the roulette-gaming system is one of the wagered Mahjong events, and when the Mahjong event provided by the roulette-gaming system is one of the wagered Mahjong events, calculating a payout.

2. The roulette-gaming system of claim 1, wherein the predetermined Mahjong events comprise one or more of a Bamboo event, a Circle event, a Wan event, a Red Dragon event, a Kong, a Pung, and a Chow.

3. The roulette-gaming system of claim 1, further comprising:

a first dome disposed over the first mechanical roulette wheel;

a second dome disposed over the second mechanical roulette wheel;

the first ball, wherein the first ball is disposed between the first dome and the first mechanical roulette wheel; and the second ball, wherein the second ball is disposed between the second dome and the second mechanical roulette wheel.

4. The roulette-gaming system of claim 3, further comprising:

a third ball disposed between the first dome and the first mechanical roulette wheel; and a fourth ball disposed between the second dome and the second mechanical roulette wheel.

5. The roulette-gaming system of claim 1, wherein select Mahjong events form part of a progressive jackpot, and wherein the at least one processor determines if the Mahjong event provided by the roulette-gaming system is one of the select Mahjong events.

6. The roulette-gaming system of claim 1, wherein each of the first plurality of ball-receiving sectors is marked with the select Mahjong symbol associated therewith, and wherein each of the second plurality of ball-receiving sectors is marked with the select Mahjong symbol associated therewith.

7. The roulette-gaming system of claim 1, wherein the first mechanical roulette wheel is connected to the second mechanical roulette wheel.

8. A method comprising:

detecting a wager on selected ones of predetermined Mahjong events by at least one processor, thereby resulting in wagered Mahjong events;

providing a Mahjong event by:

receiving a first ball by a first random one of a first plurality of ball-receiving sectors of a first mechanical roulette wheel, each of the first plurality of ball-receiving sectors associated with a select Mahjong symbol; and receiving a second ball by a second random one of a second plurality of ball-receiving sectors of a second mechanical roulette wheel, each of the second plurality of ball-receiving sectors associated with a select Mahjong symbol, wherein the Mahjong event is based at least in part on a first particular Mahjong symbol associated with the first random one of the first plurality of ball-receiving sectors and a second particular Mahjong symbol associated with the second random one of the second plurality of ball-receiving sectors;

determining if the provided Mahjong event is one of the wagered Mahjong events by the at least one processor; and when the provided Mahjong event is one of the wagered Mahjong events, calculating a payout by the at least one processor.

9. The method of claim 8, wherein the predetermined Mahjong events comprises one or more of a Bamboo event, a Circle event, a Wan event, a Red Dragon event, a Kong, a Pung, and a Chow.

10. The method of claim 8, wherein select Mahjong events form part of a progressive jackpot, and wherein the at least one processor determines if the provided Mahjong event is one of the select Mahjong events.

11. The method of claim 8, wherein each of the first plurality of ball-receiving sectors is marked with the select Mahjong symbol associated therewith, and wherein each of the second plurality of ball-receiving sectors is marked with the select Mahjong symbol associated therewith.

12. The method of claim 8, wherein the first mechanical roulette wheel is connected to the second mechanical roulette wheel.

* * * * *